US012170090B2

(12) United States Patent
Giron et al.

(10) Patent No.: US 12,170,090 B2
(45) Date of Patent: Dec. 17, 2024

(54) ELECTRONIC DEVICE, METHOD AND COMPUTER PROGRAM

(71) Applicant: Sony Group Corporation, Tokyo (JP)

(72) Inventors: Franck Giron, Stuttgart (DE); Elke Schächtele, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 250 days.

(21) Appl. No.: 17/771,071

(22) PCT Filed: Nov. 3, 2020

(86) PCT No.: PCT/EP2020/080819
§ 371 (c)(1),
(2) Date: Apr. 22, 2022

(87) PCT Pub. No.: WO2021/089544
PCT Pub. Date: May 14, 2021

(65) Prior Publication Data

US 2022/0392461 A1 Dec. 8, 2022

(30) Foreign Application Priority Data

Nov. 5, 2019 (EP) .................................... 19207275

(51) Int. Cl.

*G10L 19/008* (2013.01)
*H04S 1/00* (2006.01)
*H04S 7/00* (2006.01)

(52) U.S. Cl.

CPC ............ *G10L 19/008* (2013.01); *H04S 1/002* (2013.01); *H04S 7/30* (2013.01); *H04S 2400/11* (2013.01)

(58) Field of Classification Search

CPC ......... G06F 16/683; G06F 16/68; G06F 3/162
USPC ........................................................... 700/94
See application file for complete search history.

(56) References Cited

U.S. PATENT DOCUMENTS

| | | | | |
|---|---|---|---|---|
| 2,686,294 | A | 8/1954 | Hower | |
| 8,952,233 | B1 | 2/2015 | Johnson | |
| 2011/0081024 | A1 | 4/2011 | Soulodre | |
| 2012/0177204 | A1* | 7/2012 | Hellmuth | G10L 19/008 381/22 |
| 2014/0297296 | A1* | 10/2014 | Koppens | G10L 19/008 704/500 |
| 2015/0146873 | A1 | 5/2015 | Chabanne et al. | |

(Continued)

FOREIGN PATENT DOCUMENTS

| | | | |
|---|---|---|---|
| EP | 1377959 | B1 | 6/2011 |
| JP | 2000295700 | A | 10/2000 |

(Continued)

OTHER PUBLICATIONS

International Search Report and Written Opinion mailed on Jan. 12, 2021, received for PCT Application PCT/EP2020/080819, Filed on Nov. 3, 2020, 9 pages.

(Continued)

*Primary Examiner* — Alexander Krzystan
(74) *Attorney, Agent, or Firm* — XSENSUS LLP

(57) ABSTRACT

An electronic device comprising circuitry configured to analyze the results of a stereo or multi-channel source separation to determine one or more time-varying parameters, and to create spatially dynamic audio objects based on the one or more time-varying parameters.

20 Claims, 16 Drawing Sheets

(56) References Cited

U.S. PATENT DOCUMENTS

| | | | | |
|---|---|---|---|---|
| 2016/0037282 | A1 | 2/2016 | Giron | |
| 2016/0125867 | A1* | 5/2016 | Jarvinen | G10K 11/17857 381/73.1 |
| 2017/0289721 | A1 | 10/2017 | Davis | |
| 2021/0055796 | A1* | 2/2021 | Mansbridge | G06F 3/167 |
| 2022/0392461 | A1* | 12/2022 | Giron | G10L 19/008 |

FOREIGN PATENT DOCUMENTS

| | | | |
|---|---|---|---|
| JP | 2002304191 | A | 10/2002 |
| JP | 2012211768 | A | 11/2012 |
| WO | 2013/006325 | A1 | 1/2013 |
| WO | 2014/204997 | A1 | 12/2014 |

OTHER PUBLICATIONS

Kamado et al., "Object-Based Stereo Up-Mixer for Wave Field Synthesis Based on Spatial Information Clustering", 20th European Signal Processing Conference (EUSIPCO 2012), Aug. 27-31, 2012, pp. 594-598.

Kraft et al., "Low-Complexity Stereo Signal Decomposition and Source Separation for Application in Stereo to 3D Upmixing", Audio Engineering Society, Convention Paper 9586, Presented at the 140th Convention, Jun. 4-7, 2016, pp. 1-10.

Cano et al., "Musical Source Separation: An Introduction", IEEE Signal Processing Magazine, vol. 36, No. 1, Jan. 2019, pp. 31-40.

* cited by examiner

ELECTRONIC DEVICE, METHOD AND COMPUTER PROGRAM

CROSS-REFERENCE TO RELATED APPLICATIONS

The present application is based on PCT filing PCT/EP2020/080819, filed Nov. 3, 2020, which claims priority to EP 19207275.9, filed Nov. 5, 2019, the entire contents of each are incorporated herein by reference.

TECHNICAL FIELD

The present disclosure generally pertains to the field of audio processing, in particular to devices, methods and computer programs for source separation and mixing.

TECHNICAL BACKGROUND

There is a lot of audio content available, for example, in the form of compact disks (CD), tapes, audio data files which can be downloaded from the internet, but also in the form of sound tracks of videos, e.g. stored on a digital video disk or the like, etc. Typically, audio content is already mixed, e.g. for a mono or stereo setting without keeping original audio source signals from the original audio sources which have been used for production of the audio content. However, there exist situations or applications where a mixing of the audio content is envisaged.

With the arrival of spatial audio object oriented systems like Dolby Atmos, DTS-X or more recently Sony 360RA, there is a need to find some methods to also enjoy the huge amount of legacy content, which has not been mixed originally with the concept of audio oriented object in mind. Some existing upmixing systems are trying to extract some spectrally based features or are adding some external effects to render the legacy content spatially. Accordingly, although there generally exist techniques for mixing audio content, it is generally desirable to improve devices and methods for mixing of audio content.

SUMMARY

According to a first aspect, the disclosure provides an electronic device comprising circuitry configured to analyze the results of a stereo or multi-channel source separation to determine one or more time-varying parameters, and to create spatially dynamic audio objects based on the one or more time-varying parameters.

According to a further aspect, the disclosure provides a method comprising analyzing the results of a stereo or multi-channel source separation to determine one or more time-varying parameters, and to create spatially dynamic audio objects based on the one or more time-varying parameters.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
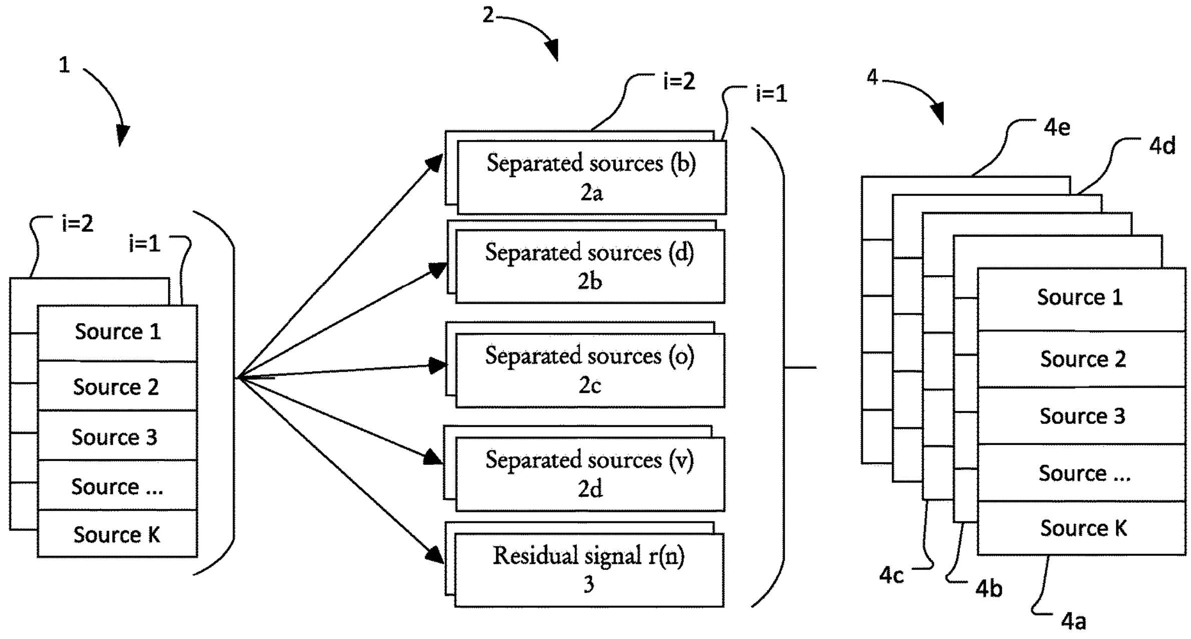
FIG. 1 schematically shows a general approach of audio upmixing/remixing by means of blind source separation (BSS), such as music source separation (MSS)

Before a detailed description of the embodiments under reference of FIG. 1 to FIG. 11, some general explanations are made.

The embodiments disclose an electronic device comprising circuitry configured to analyze the results of a stereo or multi-channel source separation to determine one or more time-varying parameters, and to create spatially dynamic audio objects based on the one or more time-varying parameters.

The electronic device may thus provide audio content having spatial audio object oriented, which contents or creates a more natural sound comparing with conventional stereo audio content. By taking time-varying parameters into account, a time-dependent spatial upmix, which, for example, preserves the original balance of the content, may be achieved by analyzing the results of a multi-channels (source) separation and creating spatially dynamic audio objects.

The circuitry of the electronic device may include a processor, may, for example, be CPU, a memory (RAM, ROM or the like), and/or storage, interfaces, etc. Circuitry may also comprise or may be connected with input means (mouse, keyboard, camera, etc.), output means (display (e.g. liquid crystal, (organic) light emitting diode, etc.)), loudspeakers, etc., a (wireless) interface, etc., as it is generally known for electronic devices (computers, smartphones, etc.). Moreover, the electronic device may be an audio-enabled product, which generates some multi-channel spatial rendering. The electronic device may be TV, sound-bar, multi-channels (playback) system, virtualizer on headphones, Binaural Headphones, or the like.

As mentioned in the outset, there is a lot of audio content already mixed as a stereo audio content signal, which has two audio channels. In particular, with conventional stereo, each sound of an audio signal is fixed with a specific channel. For example, in one channel may be fixed instruments like guitar, drums, or the like and in the other channel may be fixed instruments like guitar, vocals, other, or the like. Therefore, sounds of each channel are tied to a specific speaker.

Accordingly, the circuitry may be configured to determine, as a time-varying parameter, a parameter describing the signal level-loudness between separated channels, and/or a spectral balance parameter, and/or a primary-ambience indicator, and/or a dry-wet indicator, and/or a parameter describing the percussive-harmonic content.

Moreover, position mapping may include audio object positioning that may be genre dependent for example or may be computed dynamically based on a combination of different indexes. The position mapping may for example be implemented using an algorithm such as described in the embodiments below. For example, a dry/wet primary/ambience indicator may be used or may be combined with the ratio of anyone of the separated sources to modify the parameters of the audio-objects like spread in monopole synthesis, which may create a more enveloping sound field, or the like.

The electronic device, when performing upmixing, may modify the original content and may take into account its specificity in particular, the balance of instruments in the case of stereo content.

In particular, the circuitry may be configured to determine, as a time-varying parameter, a parameter describing the balance of instruments in a stereo content, and to create the spatially dynamic audio objects based on the balance of instruments in the stereo content.

The circuitry may be configured to determine, as a time-varying parameter, a side-mid ratio of a separated source, and to create the spatially dynamic audio objects based on the side-mid ratio.

In this way, the electronic device may create spatial mixes which are content dependent and match more naturally and intuitively to the original intention of the mixing engineers or composers. The derived meta-data can also be used as a starting point for an audio engineer to create a new spatial mix.

The circuitry may be configured to determine spatial positioning parameters for the audio objects based on the one or more time-varying parameters obtained from the results of the stereo or multi-channel source separation.

Determining spatial positioning parameters may comprise performing position mapping based on positioning indexes. Position indices may allow selecting a position of an audio object from an array of possible positions. Moreover, performing position mapping may result in an automatic creation of a spatial object audio mix from an analysis of an existing multi-channels content or the like.

In some embodiments, the circuitry may be further configured to perform segmentation based on the side-mid ratio to obtain segments of the separated source.

In some embodiments, the side-mid ratio calculation may include a silence suppression process. A silence suppression process may include a silence detection in stereo channels. In a presence of silent parts on the separated sources the side-mid ratio may be set to zero.

The circuitry may be configured to dynamically adapt positioning parameters of the audio objects. Spatial positioning parameters may for example positioning indexes, an array of positioning indexes, a vector of positions, an array of positions, or the like. Some embodiments may use a positioning index depending on an original balance between the separated channels of a music sound source separation process, without limiting the present invention to that regard.

Deriving spatial positioning parameters may result to a spatial mix, where each separated (instrument) sources may be treated separately. The spatial mixes may be content dependent and may match naturally and intuitively to original intention of mixing of a user. The derived content may be derived meta-data, which may be used as a starting point to create a new spatial mix, or the like.

The circuitry may be configured to create the spatially dynamic audio objects by monopole synthesis. For example, the circuitry may be configured to dynamically adapt a spread in monopole synthesis. In particular, the spatially dynamic audio objects may be monopoles.

The circuitry may be configured to dynamically create, based on the one or more time-varying parameter, a first monopole used for rendering the left channel of a separated source, and a second monopole used for rendering the right channel of the separated source.

The circuitry may be configured to create, from the results of the multi-channel source separation, a time-dependent spatial upmix which preserves the original balance of the content.

The circuitry may be configured to perform, based on the time-varying parameter, a segmentation process to obtain segments of a separated source.

In some embodiments, the automatic time-dependent spatial upmixing is based on the results of a similarity analysis of multi-channels content. The automatic time-dependent spatial upmixing may for example be implemented using an algorithm such as described in the embodiments below.

The circuitry may be configured to perform a cluster detection based on the time-varying parameter. The cluster detection may be implemented using an algorithm, such as described in the following embodiments.

The circuitry may be configured to perform a smoothening process on the segments of the separated source.

The circuitry may be configured to perform a beat detection process to analyze the results of the multi-channel source separation.

The time-varying parameter may be determined per beat, per window, or per frame of a separated source.

The embodiments also disclose a method comprising analyzing the results of a stereo or multi-channel source separation to determine one or more time-varying parameters, and to create spatially dynamic audio objects based on the one or more time-varying parameters.

The embodiments also disclose a computer program comprising instructions which, when the program is executed by a computer, cause the computer to carry out the methods and processes describe above and in the embodiments below.

Embodiments are now described by reference to the drawings.

The process of the embodiments described below in more detail starts with a (music) source separation approach (see FIG. 1 and the corresponding description), for example using a stereo content. After source separation, the energy of the left and right channel are compared to each other, in particular using a side/mid ratio calculation (see FIG. 5*a,c,d* and the corresponding description). This ratio is then used to derive a time-varying index (see FIGS. 8*a,b,c,d* and the corresponding description), which point to an array of (predefined) positions. These positions are finally used in conjunction with an audio-object based rendering method (monopole synthesis in the particular embodiment of FIG. 9). To prevent unnatural, unpleasant, or too fast position variations (like spatial jump in time), the ratio may previously be segmented (see FIGS. 6*a, b, c, d* and the corresponding description) and averaged in time-clusters (see FIGS. 7*a, b* and the corresponding description) depending on the music beat, but this step is also optional and could be replaced by any other time-smoothing methods.

Audio Upmixing/Remixing by Means of Blind Source Separation (BSS)

FIG. 1 schematically shows a general approach of audio upmixing/remixing by means of blind source separation (BSS), such as music source separation (MSS). A source separation (also called "demixing") is performed which decomposes a source audio signal 1 comprising multiple channels I and audio from multiple audio sources Source 1, Source 2, . . . , Source K (e.g. instruments, voice, etc.) into "separations", here into source estimates 2*a*-2*d* for each channel i, wherein K is an integer number and denotes the number of audio sources. In the embodiment here, the source audio signal 1 is a stereo signal having two channels i=1 and i=2. As the separation of the audio source signal may be imperfect, for example, due to the mixing of the audio sources, a residual signal 3 (r(n)) is generated in addition to the separated audio source signals 2*a*-2*d*. The residual signal may for example represent a difference between the input audio content and the sum of all separated audio source signals. The audio signal emitted by each audio source is represented in the input audio content 1 by its respective recorded sound waves. For input audio content having more than one audio channel, such as stereo or surround sound input audio content, also a spatial information for the audio sources is typically included or represented by the input audio content, e.g. by the proportion of the audio source signal included in the different audio channels. The separation of the input audio content 1 into separated audio source signals 2*a*-2*d* and a residual 3 is performed on the basis of blind source separation or other techniques which are able to separate audio sources.

In a second step, the separations 2*a*-2*d* and the possible residual 3 are remixed and rendered to a new loudspeaker signal 4, here a signal comprising five channels 4*a*-4*e*, namely a 5.0 channel system. On the basis of the separated audio source signals and the residual signal, an output audio content is generated by mixing the separated audio source signals and the residual signal on the basis of spatial information. The output audio content is exemplary illustrated and denoted with reference number 4 in FIG. 1.

In the following, the number of audio channels of the input audio content is referred to as $M_{in}$ and the number of audio channels of the output audio content is referred to as $M_{out}$. As the input audio content 1 in the example of FIG. 1 has two channels i=1 and i=2 and the output audio content 4 in the example of FIG. 1 has five channels 4*a*-4*e*, $M_{in}=2$ and $M_{out}=5$. The approach in FIG. 1 is generally referred to as remixing, and in particular as upmixing if $M_{in}<M_{out}$. In the example of the FIG. 1 the number of audio channels $M_{in}=2$ of the input audio content 1 is smaller than the number of audio channels $M_{out}=5$ of the output audio content 4, which is, thus, an upmixing from the stereo input audio content 1 to 5.0 surround sound output audio content 4.

In audio source separation, an input signal comprising a number of sources (e.g. instruments, voices, or the like) is decomposed into separations. Audio source separation may be unsupervised (called "blind source separation", BSS) or partly supervised. "Blind" means that the blind source separation does not necessarily have information about the original sources. For example, it may not necessarily know how many sources the original signal contained or which sound information of the input signal belong to which original source. The aim of blind source separation is to decompose the original signal separations without knowing the separations before. A blind source separation unit may use any of the blind source separation techniques known to the skilled person. In (blind) source separation, source signals may be searched that are minimally correlated or maximally independent in a probabilistic or information-theoretic sense or on the basis of a non-negative matrix factorization structural constraints on the audio source signals can be found. Methods for performing (blind) source separation are known to the skilled person and are based on, for example, principal components analysis, singular value decomposition, (in)dependent component analysis, non-negative matrix factorization, artificial neural networks, etc.

Although some embodiments use blind source separation for generating the separated audio source signals, the present disclosure is not limited to embodiments where no further information is used for the separation of the audio source signals, but in some embodiments, further information is used for generation of separated audio source signals. Such further information can be, for example, information about the mixing process, information about the type of audio sources included in the input audio content, information about a spatial position of audio sources included in the input audio content, etc.

The input audio signal can be an audio signal of any type. It can be in the form of analog signals, digital signals, it can origin from a voice recorder, a compact disk, digital video disk, or the like, it can be a data file, such as a wave file, mp3-file or the like, and the present disclosure is not limited to a specific format of the input audio content. An input audio content may for example be a stereo audio signal having a first channel input audio signal and a second channel input audio signal, without that the present disclosure is limited to input audio contents with two audio channels. An input audio signal may be a multi-channels content signal. For example, in other embodiments, the input audio content may include any number of channels, such as remixing of an 5.1 audio signal or the like. The input signal may comprise one or more source signals. In particular, the input signal may comprise several audio sources. An audio source can be any entity, which produces sound waves, for example, music instruments, voice, vocals, artificial generated sound, e.g. origin form a synthesizer, etc.

The input audio content may represent or include mixed audio sources, which means that the sound information is not separately available for all audio sources of the input audio content, but that the sound information for different audio sources, e.g., at least partially overlaps or is mixed.

The separations produced by blind source separation from the input signal may for example comprise a vocals separation, a bass separation, a drums separations and another separation. In the vocals separation all sounds belonging to human voices might be included, in the bass separation all noises below a predefined threshold frequency might be included, in the drums separation all noises belonging to the drums in a song/piece of music might be included and in the other separation, all remaining sounds might be included. Source separation obtained by a Music Source Separation (MSS) system may result in artefacts such as interference, crosstalk or noise.

Time-Dependent Spatial Upmixing with Dynamic Sound Objects

According to the embodiments described below in more detail, a side-mid ratio parameter obtained from a separated source is used to modify the parameters of audio-objects of a virtual sound system used for rendering the separated source. In particular, the spread in monopole synthesis (i.e. the position of the monopoles used for rendering the separated source) is influenced. This creates a more enveloping sound field.

Figure 2:
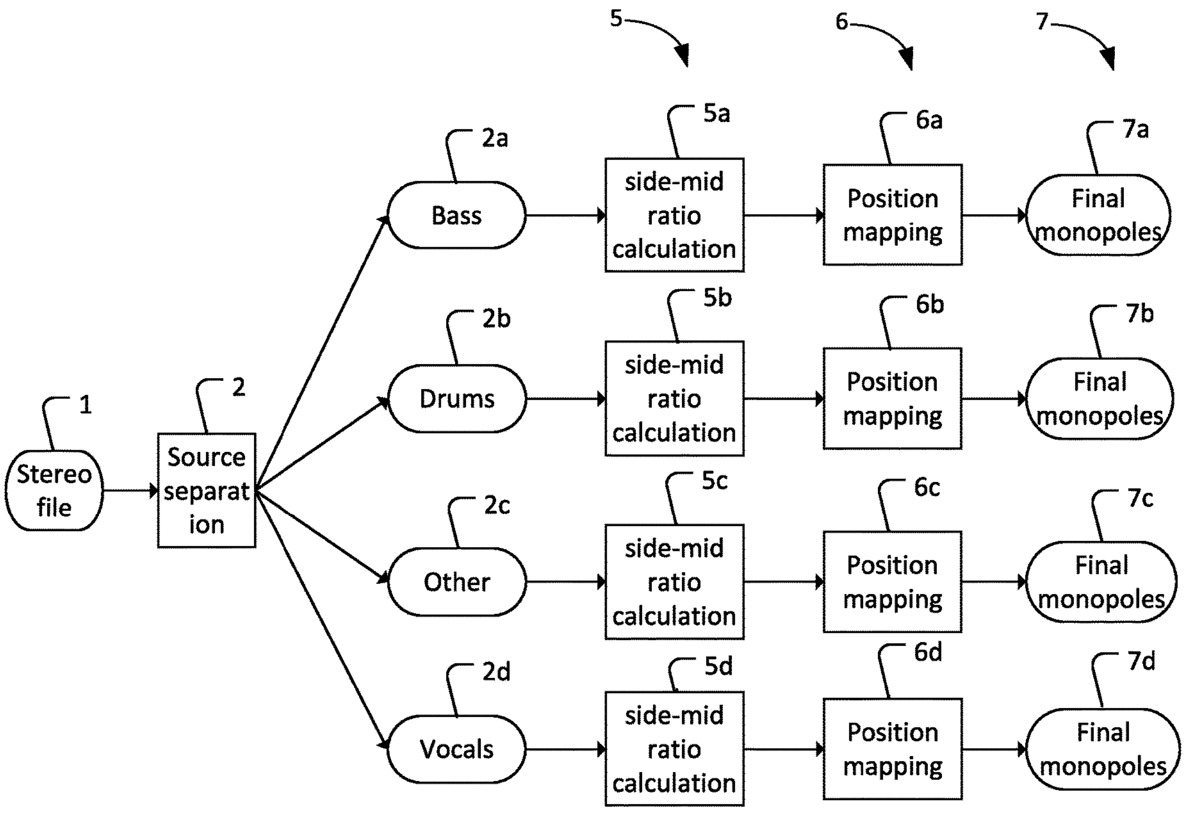
FIG. 2 schematically shows a process of automatic time-dependent spatial upmixing of separated sources in which a placing monopoles is performed based on a calculated side-mid ratio.

FIG. 2 schematically shows a process of automatic time-dependent spatial upmixing of separated sources in which a placing of monopoles is performed based on a calculated side-mid ratio. A stereo file 1, containing multiple sources (see Source 1, 2, . . . K in FIG. 1), with two channels (i.e. $M_{in}=2$), namely a left channel and a right channel, is input to a source separation 2 (as it is described with regard to FIG. 1 above). The process of source separation 2 decomposes the stereo file 1 into separations, namely a "Bass" separation 2*a*, a "Drums" separation 2*b*, an "Other" separation 2*c* and a "Vocals" separation 2*d*. The "Bass", "Drums", and "Vocals" separations 2*a*, 2*b*, 2*d* reflect respective "instruments" in the mix contained in the stereo file 1, and the "Other" separation 2*c* reflects the residual. Each of the separations 2*a*, 2*b*, 2*c*, 2*d* is again a stereo file output by the process of source separation 2.

The "Bass" separation 2*a* is processed using a side-mid ratio calculation 5 in order to determine a side-mid ratio for the Bass separation. The side-mid ratio calculation 5 process compares the energy of the left channel to the energy of the right channel of the stereo file representing the Bass separation to determine the side-mid ratio and is described in more detail with regard to FIGS. 5*a*, and 5*b* below. A position mapping 6*a* is performed based on the calculated side-mid ratio of the Bass separation to derive positions of monopoles 7*a* used for rendering the Bass separation 2*a* with an audio rendering system. The "Drums" separation 2*b* is processed using a side-mid ratio calculation 5*b* in order to determine a side-mid ratio for the Drums separation. A position mapping 6*b* is performed based on the calculated side-mid ratio to derive positions of monopoles 7*b* used for rendering the Drums separation 2*b* with an audio rendering system. The "Other" separation 2*c* is processed using a side-mid ratio calculation 5*c* in order to determine a side-mid ratio for the Other separation. A position mapping 6*c* is performed based on the calculated side-mid ratio of the Other separation to derive positions of monopoles 7*c* used for rendering the Other separation 2*c* with an audio rendering system. The "Vocals" separation 2*d* is processed using a side-mid ratio calculation 5*d* in order to determine a side-mid ratio for the Vocals separation. A position mapping 6*d* is performed based on the calculated side-mid ratio of the Vocals separation to derive positions of monopoles 7*d* used for rendering the Vocals separation 2*d* with an audio rendering system.

In the above described embodiment, the process of source separation decomposes the stereo file into the separations "Bass", "Drums", "Other", and "Vocals". These types of separations are only given for the purpose of illustration but they can be replaced by an type as instrument as it has been trained with a DNN.

In the above described embodiment, audio upmixing is performed on a stereo file which comprises two channels. The embodiments, however, are not limited to stereo files. The input audio content may also be a multichannel content such as a 5.0 audio file, a 5.1 audio file, or the like.

Figure 3:
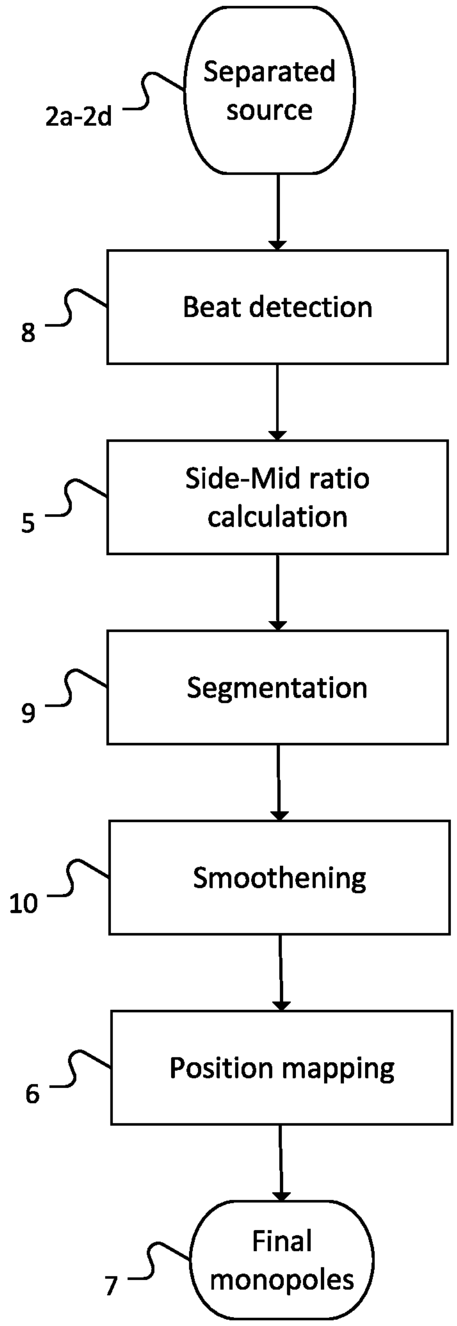
FIG. 3 illustrates a detailed exemplary embodiment of a process of a spatial upmixing of a separated source such as described in FIG. 2.

FIG. 3 illustrates a detailed exemplary embodiment of a process of a spatial upmixing of a separated source such as described in FIG. 2 above. A process of beat detection 8 is performed on a separated source 2*a*-2*d* (e.g. a bass, drums, other or vocals separation), or alternatively, on the original stereo file (stereo file 1 in FIG. 2), in order to divide the audio signal in beats. The separated source is processed using a side-mid ratio calculation 5, to obtain a side-mid ratio per beat. An embodiment of this process of calculating 5 the side-mid ratio is described in more detail with regard to FIGS. 5*a* and 5*b* and equation 1 below. A process of segmentation 9 is performed based on the side-mid ratio to obtain segments of the separated source. The segmentation 9 process for example includes performing clustering of the per beat side-mid ratio as described in more detail with regard to FIGS. 6*a*-6*c* below. For each segment, a smoothening 10 is performed on the side-mid ratio to obtain a per-segment side-mid ratio. A position mapping 6 is performed on the per-segment side-mid ratio to derive positions of final monopoles 7, that is, to map the per-segment side-mid ratio on one of a plurality of possible positions at which the final monopoles 7 used for rendering the separated source 2*a*-2*d* should be placed.

It is understood that monopoles are only an example of audio objects that may be positioned according to the principles of the example process shown in FIG. 3. In the same way, other audio objects might be positioned according to the principles of the example process.

Still further, it is understood that this is only one example of a possible embodiment, but that each step can be replaced by other analysis method and the audio object positioning could be also made genre dependent for example or computed dynamically based on the combination of different indexes. For example, a dry/wet, or a primary/ambience indicator could also be used instead of the side/mid ratio or combined with the side/mid ratio to modify the parameters of the audio-objects like spread in monopole synthesis, which would create a more enveloping sound field.

Beat Detection

A process of beat detection is performed on the original stereo signal (embodiment of FIG. 4*a*), or alternatively, on a separated source (embodiment of FIG. 4*b*) in order to divide the audio signal in small sections (time windows).

Figure 4A:
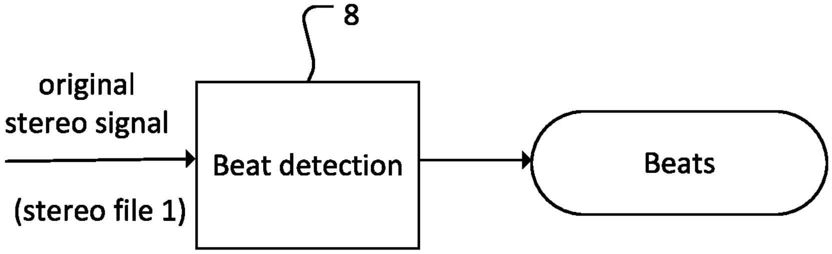
FIG. 4*a* schematically describes an embodiment of a beat detection process, as described in FIG. 3, performed on the original stereo signal.

FIG. 4*a* schematically describes in more detail an embodiment of a beat detection process performed in the process of spatial upmixing of a separated source described in FIG. 3 above, in which the beat detection is performed on the original stereo signal (stereo file 1 in FIG. 2) in order to divide the stereo signal, in beats.

In this embodiment of FIG. 4*a*, a process of beat detection 8 is performed on the original stereo signal, in order to divide the audio signal in small sections (time windows). Beat detection is a windowing process which is particularly adequate for audio signals that represent music content.

By the beat detection, the audio signal of the original stereo signal (stereo file 1 in FIG. 2) is divided in time windows of a certain length. In certain genres of music, the tempo of the music (typically measured in beats per minute, bpm) is rather constant so that the beats have substantially a fixed length. However, tempo changes may occur so that the window length defined by the beats may change as the piece of music proceeds from one section to a next section. Any processes for beat detection known to the skilled person may be used to implement the beat detection process 8 of FIG. 4, for example the method of bpm determination disclosed in EP 1377959 B1, a beat detector circuit as disclosed in U.S. Pat. No. 2,686,294 A, a system for calculating the tempo of music such as disclosed in U.S. Pat. No. 8,952,233, or the like. The processes of beat detection typically result in a set of time markers, each time marker indicating the start of a respective beat. These time markers divide the audio signal in small sections (time windows) which may be used as a subdivision of the audio signal for performing further processing of the audio signal (e.g. determining audio characteristics such as the side/mid ratio described with regard to FIGS. 5*a* to 4*d* below).

Figure 4B:
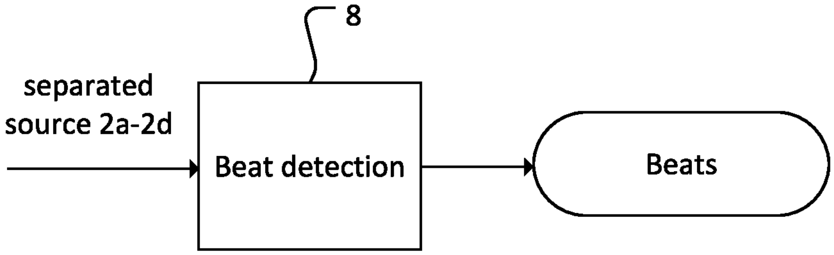
FIG. 4*b* schematically describes an embodiment of a beat detection process as performed in the process of spatial upmixing of a separated source described in FIG. 3.

FIG. 4*b* schematically describes in more detail an alternative embodiment of a beat detection process as performed in the process of spatial upmixing of a separated source described in FIG. 3 above. In this embodiment, the beat detection is performed on a separated source 2*a*-2*d*, in order to divide the separated source signal, in beats and thus, to obtain a per-beat separated source.

A beat detection process, as describe above under reference of FIG. 4*a*, is performed on a separated source 2*a*-2*d*, in order to divide the separated source signal, in beats and thus, to obtain a per-beat separated source. As mentioned, by the beat detection, the audio signal of the separated source 2*a*-2*d* is divided in time windows of a certain length. In certain genres of music, the tempo of the music (typically measured in beats per minute, bpm) is rather constant so that the beats have substantially a fixed length.

Beat detection is a windowing process which is particularly adequate for audio signals that represent music content. As an alternative to beat detection, a windowing process (or framing process) may be performed based on a predefined and constant window size, and based on a predefined "hopping distance" (in samples). The window size may be arbitrarily chosen (e.g. in samples, such as 128 samples per window, 512 samples per window, or the like. The hopping distance may for example chosen as equal to the window length, or overlapping windows/frames might be chosen.

In still other embodiments, no beat detection or windowing process is applied, but a e.g. side-mid ration is processed on a sample by sample basis (which corresponds to a window size of one sample).

Side-Mid Processing

Figure 5A:
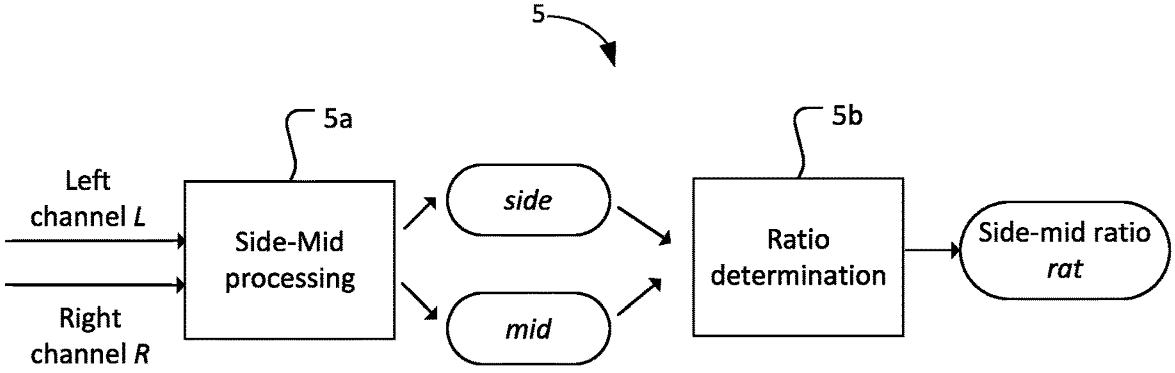
FIG. 5*a* schematically describes an embodiment of the side-mid ratio calculation as performed in the process of spatial upmixing of a separated source described in FIG. 3.

FIG. 5*a* schematically describes an embodiment of the side-mid ratio calculation as performed in the process of spatial upmixing of a separated source described in FIG. 3 above. A Mid/Side processing 5*a* (also called M/S processing) is performed on a separated source 2*a*-2*d* in order to obtain a Mid signal mid and a Side signal side of the separated source 2*a*-2*d*. For each beat of the separated source 2*a*-2*d*, the Mid signal and the Side signal side are related to each other by determining the ratio rat of the energy of the Mid signal and the Side signal.

The side signal and the mid signal are computed using the equation 1:

$$side = 0.5\cdot(L-R)$$

$$mid = 0.5\cdot(L+R) \qquad \text{(equation 1)}$$

The mid signal mid is computed by summing the left signal L to the right signal R of the separated source 2*a*-2*d*, and then multiplying the computed sum with a normalization factor of 0.5 (in order to preserve loudness). The side signal side is computed by subtracting the signal R of the right channel of the separated source 2*a*-2*d* from the signal L of the left channel of the separated source 2*a*-2*d*, and then multiplying the computed difference with a normalization factor of 0.5

For each beat of the separated source 2*a*-2*d*, the Mid signal mid and the Side signal side are related to each other by determining the ratio rat of the energy of the Mid signal mid and the Side signal side using the equation 2:

$$rat = \frac{\text{mean}(side^2)}{\text{mean}(mid^2)} \qquad \text{(equation 2)}$$

Here, $side^2$ is the energy $side^2$ of the Side signal side which is computed by samplewise squaring the side signal side, and $mid^2$ is the energy of the Mid signal mid is computed by samplewise squaring the mid signal mid. The ratio rat of the energy of the Mid signal mid and the Side signal side is computed by averaging the energy $side^2$ of the Side signal side over a beat to obtain the average value mean ($side^2$) of the side energy for the beat, by averaging the energy $mid^2$ of the Mid signal mid over the same beat to obtain the average value mean ($mid^2$) of the mid energy for the beat, and dividing the average mean ($side^2$) of the side energy by the average mean ($mid^2$) of the mid energy.

The energy of a signal is related to the amplitude of the signal, and may for example be obtained as the short-time energy as follows:

$$E=\int_{-\infty}^{\infty}|x(t)|^2 dt \qquad \text{(equation 3)}$$

where x(t) is the audio signal, here in particular the left channel L or the right channel R.

In this embodiment, the side-mid ratio is calculated per beats and therefore it leads to smoother values (compared to fixed window length). The beats are calculated based on the input stereo file as described with regard to FIG. 4 above.

In the embodiment above, the energy $side^2$ of the Side signal and the energy $mid^2$ of the Mid signal is used to determine a time-varying parameter rat to create spatially dynamic audio objects based on the time-varying parameter.

It is, however, not necessary to use the energy for calculating the time-varying parameter. In alternative embodiments, for example, the ratio of amplitude differences |L−R|/|L+R| may be used to determine a time-dependent factor.

Still further, in the embodiment above, a normalization factor of 0.5 is foreseen. This normalization factor is, however, only provided for reasons of convention. It is not essential as it does not influence the ration and can thus also be disregarded.

Figure 5B:
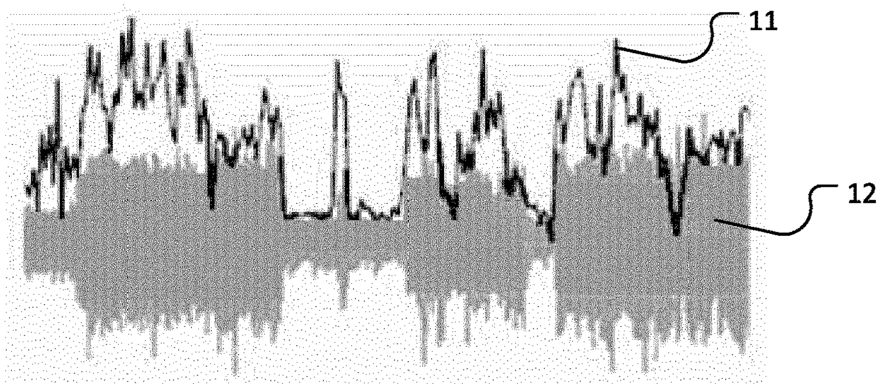
FIG. 5*b* shows a exemplifying result of the side-mid ration calculation described in FIG. 5*a;*

FIG. 5*b* shows an exemplifying result of the side-mid ration calculation described in FIG. 5*a*. In this example the side-mid ratio obtained for an "Other" separation 2*c* is displayed. The side-mid ratio of the Other separation 2*c* is represented by a curve 11 together with the signal 12 of the Other separation 2*c*.

Silent parts in separated sources may still contain virtually imperceptible artefacts. Accordingly, the side-mid ratio may be set automatically to zero in silent parts of the separated sources 2*a*-2*d*, in order to minimize such artefacts as illustrated below with regard to the embodiment of FIG. 5*c*.

Silent parts of the separated sources 2*a*-2*d* may for example be identified by comparing the energies $L^2$, and, respectively, $R^2$ of the left and right stereo channel with respective predefined threshold levels (or by comparing the overall energy $L^2+R^2$ in both stereo channels with a predefined threshold level).

Figure 5C:
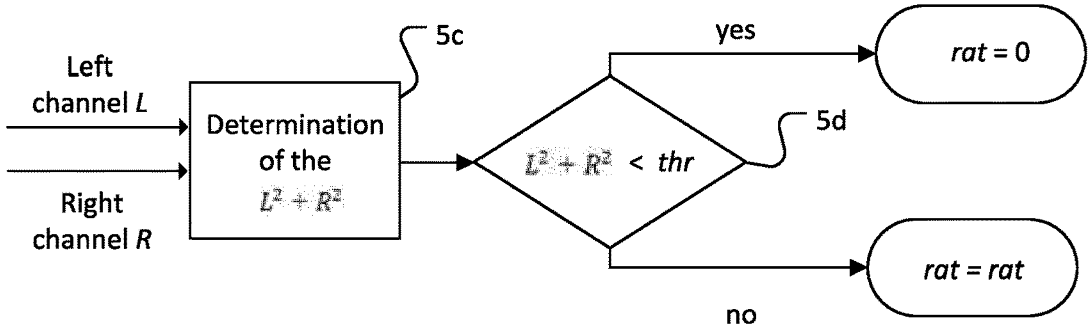
FIG. 5*c* schematically describes an embodiment of a silence suppression process as it may be performed during the side-mid ratio calculation process of a separated source described in FIG. 5*a;*

FIG. 5*c* schematically describes an embodiment of a silence suppression process as it may be performed during the side-mid ratio calculation process of a separated source described in FIG. 5*a* above. A determination 5*c* of an overall energy $L^2+R^2$ the left stereo channel L and the right stereo channel R is performed. A silence detection 5*d* is performed based on the detected overall energy $L^2+R^2$ in both stereo channels. The overall energy $L^2+R^2$ is compared with a predefined threshold level thr. In the case that the overall energy $L^2+R^2$ is less than the predefined threshold level thr (which is indicative of a presence of silent parts on the separated sources 2*a*-2*d*), the side-mid ratio rat is set automatically to zero (rat=0). In the case that the overall energy $L^2+R^2$ is more than the predefined threshold level thr, the side-mid ratio rat stays unchanged (rat=rat).

In the embodiment describe above, it is described here the derivation of a mid/side ratio as an example of a time-varying parameter. In other embodiments, time-varying parameters may for example also be signal level/loudness between separated channels, spectral balance, primary/ambience, dry/wet, percussive/harmonic content or others parameters which can be derived from Music Information Retrieval approaches, without limiting the present disclosure to that regard.

Segmentation (Cluster Detection)

For preventing unnatural, unpleasant, or too fast position variations, such as fast spatial jumps in time, or the like, the side-mid ratio may be segmented in beats and smoothened using time-smoothing methods. For example, an embodiment of an exemplary segmentation process, in which the side-mid ratio is segmented, as it will be described in detail in FIGS. 6*a*-6*c* below. In this way, a similarity of the derived content from source separation may be analyzed.

Figure 6A:
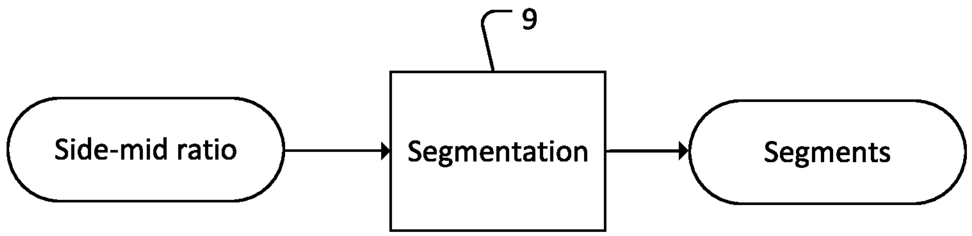
FIG. 6*a* schematically describes an embodiment of the segmentation process as performed in the process of spatial upmixing of a separated source described in FIG. 3.

FIG. 6*a* schematically describes an embodiment of the segmentation process as performed in the process of spatial upmixing of a separated source described in FIG. 3 above. A process of segmentation 9 is performed based on the side-mid ratio to obtain segments of the separated source. The segmentation 9 process for example includes performing clustering of the per-beat (or per-window) side-mid ratio. That is, the segmentation 9 process is performed on the per-beat (or per-window) side-mid ratio to obtain a per-beat (or per-window) side-mid ratio clustered in segments. As described, the goal for the segmentation 9 is to find homogeneous segments in the separated source and divide the separated source into homogeneous segments. Each segment identified as homogeneous in the side-mid ratio is expected to relate to a specific section of a piece of music with specific common characteristic. For example, the starting and ending of a background choir (or e.g. a guitar solo) could mark a beginning, respectively, the ending of a specific section of a piece of music. By identifying characteristic sections (called here "segments") of a separated source, a change in the audio rendering by relocating the virtual monopoles used to render the separated source may be restricted to the transitions from one section to the next. In this way an automatic time-dependent spatial upmixing may be based on the results of a similarity analysis of multi-channels content.

It should be noted that in the embodiment above, the segmentation happens based on the side-mid ratio (or other time-varying parameter) which provides different results for the individual separated sources (instruments). However, the time markers (detected beats) of the segmentation of the clustering process are common to all separated signals. The segmentation is done beat-synchronous to the original stereo signal, which is down-mixed into mono. Between successive beats, a time-varying parameter such as the per-beat mean of the mid-side ratio is computed for each separated signal.

Figure 6B:
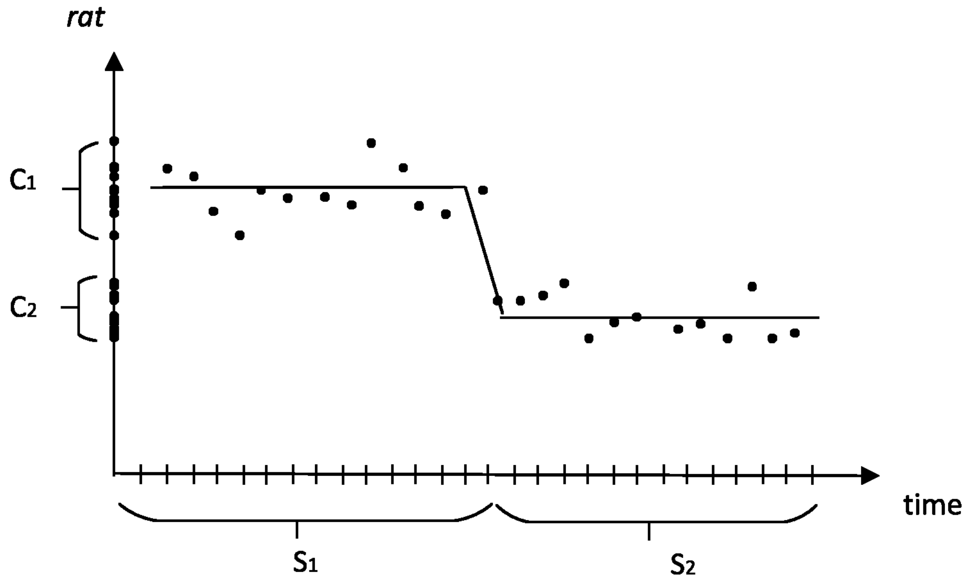
FIG. 6*b* shows a clustering process of the per-beat side-mid ratio, which is included in the segmentation process as described under the reference of FIG. 6*a;*

FIG. 6*b* shows a clustering process of the per-beat side-mid ratio, which is included in the segmentation process as described under the reference of FIG. 6*a* above. The audio source, here the separated source 2*a*-*d* comprises an amount $\mathcal{B}$ of beats, which are shown on the time axis (x axis). The beats $\mathcal{B}$ (respectively the time length of each beat) have been identified by the process described with regard to FIG. 4 above. According to the process described with regard to FIG. 5*a* above, a side-mid ratio rat(i) is obtained for every beat i in the set of beats $\mathcal{B}$ obtained by the beat detection process of FIG. 4.

In FIG. 6*b*, the per-beat side-mid ratios rat presented on the y-axis. Each side-mid ratio rat(i) for each respective beat i in the set of beats $\mathcal{B}$ is represented as a dot. In FIG. 6*b* the dots representing the side-mid ratios rat(i) of the beats $\mathcal{B}$ are mapped to the y-axis. As can be seen in FIG. 6*b*, the side-mid ratios rat(i) show a clustering in two clusters $C_1$ and $C_2$. That is beats having similar side-mid ratio values can be associated either in a cluster $C_1$ or in a cluster $C_2$. Cluster $C_1$ identifies a first segment $S_1$ of the separated source. Cluster $C_2$ identifies a second segment $S_2$ of the separated source.

As stated above, the goal of audio clustering is to identify and group together all beats, which have the same per-beat side-mid ratio. Audio beats with different per-beat side-mid ratio classification are clustered in different segments. Any clustering algorithm known to the skilled person, such as the K-means algorithm, Agglomerative Clustering (as described in https://en.wikipedia.org/wiki/Hierarchical_clustering), or the like, can be used to identify the side-mid ratio clusters which are indicative of segments of the audio signal.

Figure 6C:
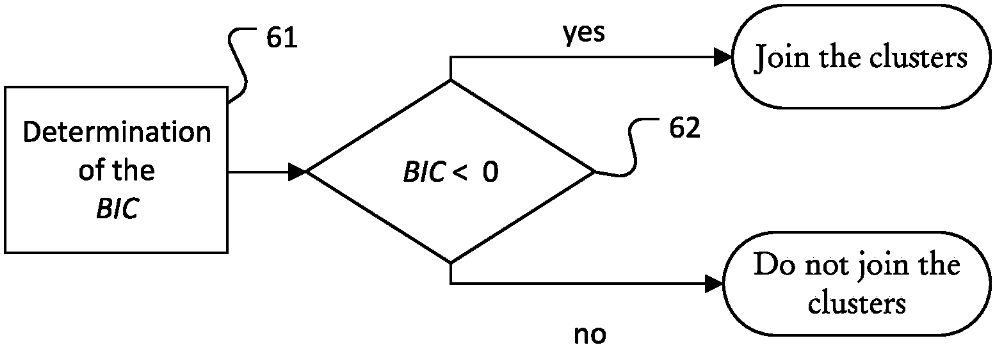
FIG. 6*c* provides an embodiment of a clustering process which might be applied for segmenting a separated source.

FIG. 6*c* provides an embodiment of a clustering process, which might be applied for segmenting a separated source. Initially, each beat is considered a cluster. The following approach is iteratively applied to the clusters. At 61, the algorithm computes a distance matrix, here a Bayesian Information Criterion BIC for all clusters. The two closer ones are considered for joining in a new cluster. To this end, at 62, it is decided if BIC<0. If it is decided at 62 that BIC<0, then the two clusters are joined together $C=\{C_1, C_2\}$. If it is decided at 62 that BIC≥0, then the two clusters are not joined together otherwise. In this way, clusters are linked together until the distances exceed a pre-defined value. At that point, the clustering ends.

The distance measure when comparing two clusters using the BIC can be stated as a model selection criterion where one model is represented by two separated clusters $C_1$ and $C_2$ and the other model represents the clusters joined together $C=\{C_1, C_2\}$. The BIC expression may be given as follows:

$$BIC=n\log|\Sigma|-n_1\log|\Sigma_1|-n_2\log|\Sigma_2|-\lambda P \quad \text{(equation 4)}$$

where $n=n_1+n_2$ is the data size (overall number of beats, windows, etc.), $\Sigma$ is the covariance matrix for cluster $C=\{C_1, C_2\}$, $\Sigma_1$ and $\Sigma_2$ are the covariance matrices for cluster $C_1$, and, respectively, cluster $C_2$, P is a penalty factor related with the number of parameters in the model, and λ, is a penalty weight. The covariance matrix Σ is given by equation 5:

$$\sum\nolimits_{1_{ij}} = \sum\nolimits_{C_1 C_{1_{ij}}} = \mathrm{cov}[\mathrm{rat}(i), \mathrm{rat}(j)] = E[(\mathrm{rat}(i)-E[\mathrm{rat}(i)])(\mathrm{rat}(j)-E[\mathrm{rat}(j)])]$$

where $\Sigma_{1_{ij}}$ is the ij-element of the covariance matrix, the operator E denotes the expected value (mean).

Figure 6D:
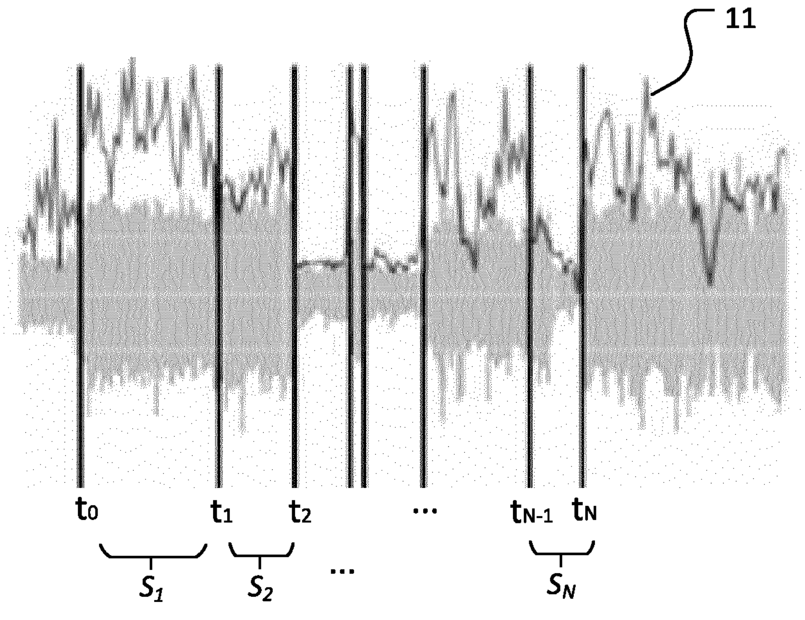
FIG. 6*d* shows the per-beat side-mid ratio clustered in segments as described under the reference of FIG. 6*a;*

FIG. 6*d* shows a separated source which has been segmented as described under the reference of FIG. 6*a* above. A first segment $S_1$ identified by the segmentation process of FIG. 6*a* starts at time instance $t_0$ and ends at time instance $t_1$. A second segment $S_2$ subsequent starts at time instance $t_1$ and ends at time instance $t_2$. Similarly, an N-th segment starts at time instance $t_{N-1}$ and ends at time instance $t_N$. The time instances $t_1 \ldots t_N$ which are indicated in FIG. 6*d* by a vertical black solid lines represent the boundaries of the segments.

Figure 7A:
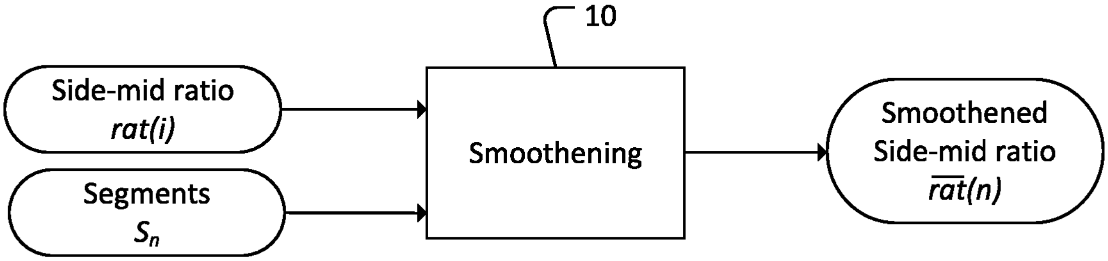
FIG. 7*a* schematically shows a time-smoothing process, in which the side-mid ratio rat of a separated source is averaged over segments of a separated source.

FIG. 7*a* schematically shows a time-smoothing process, in which the side-mid ratio rat of a separated source is averaged over segments of a separated source.

In FIG. 7*a*, a smoothening process 10 is performed on the per-beat side-mid ratio rat(i) of the separated source based on the segments $S_n$ obtained from the segmentation process 9 described under the reference of FIG. 6*a* above, to obtain a smoothened side-mid ratio $\overline{\mathrm{rat}}(n)$ for each segment $S_n$.

By means of the segmentation process described in FIG. 6*a*, the set of beats B obtained from the beat detection is divided into multiple segments $S_n$. Each segment $S_n$ comprises multiple beats as obtained by the beat detection process of FIG. 4. According to the process described with regard to FIG. 5*a* above, a side-mid ratio rat(i) is obtained for every beat i in a segment $S_n$. For a segment $S_n$, a smoothened side-mid ratio $\overline{\mathrm{rat}}(n)$ can be obtained by averaging the side-mid ratio rat(i) obtained of all beats i in a segment $S_n$:

$$\overline{\mathrm{rat}}(n) = 1/N_n \sum_{i\in S_n} \mathrm{rat}(i)$$

where $N_n=\Sigma_{i\in S_n} 1$ is the number of beats in segment $S_n$.

Figure 7B:
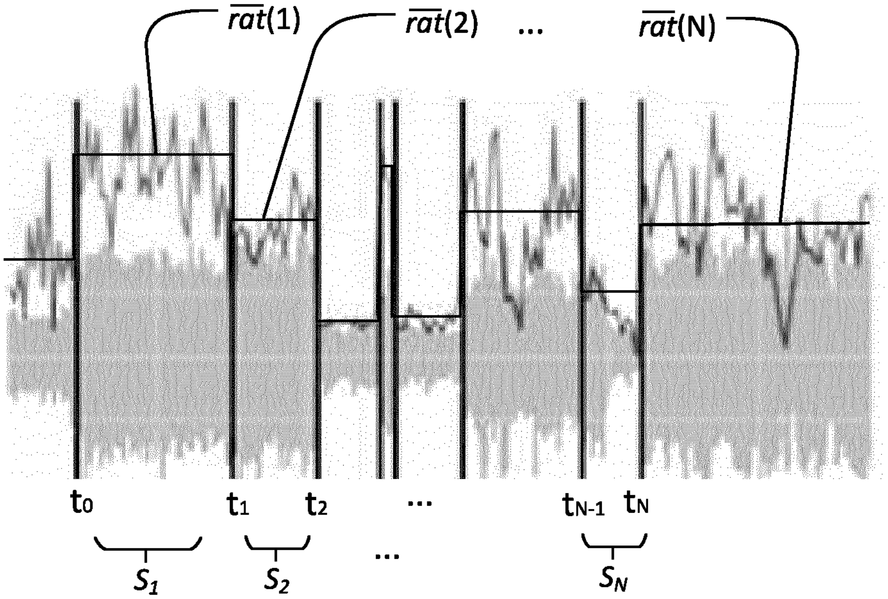
FIG. 7*b* shows an exemplifying of the smoothening process. A first segment $S_1$ identified by the segmentation process of FIG. 6*a* is associated with a smoothened side-mid ratio.

FIG. 7*b* shows an exemplifying of the smoothening process. A first segment $S_1$ identified by the segmentation process of FIG. 6*a* is associated with a smoothened side-mid ratio $\overline{\mathrm{rat}}(1)$. A second segment $S_2$ is associated with a smoothened side-mid ratio $\overline{\mathrm{rat}}(2)$. Similarly, an N-th segment is associated with a smoothened side-mid ratio $\overline{\mathrm{rat}}(N)$. The time instances $t_1 \ldots t_N$ which are indicated in FIG. 7*d* by a vertical black solid lines represent the boundaries of the segments. The smoothened side-mid ratios $\overline{\mathrm{rat}}(n)$ are indicated in FIG. 7*d* by respective horizontal black solid lines.

According to the embodiments described here in more detail, the positions of final monopoles are determined based on the side-mid ratio, and in particular based on the smoothened side-mid ratio, which attributes a side-mid ratio to every segment of the audio signal.

Position Mapping

Figure 8A:
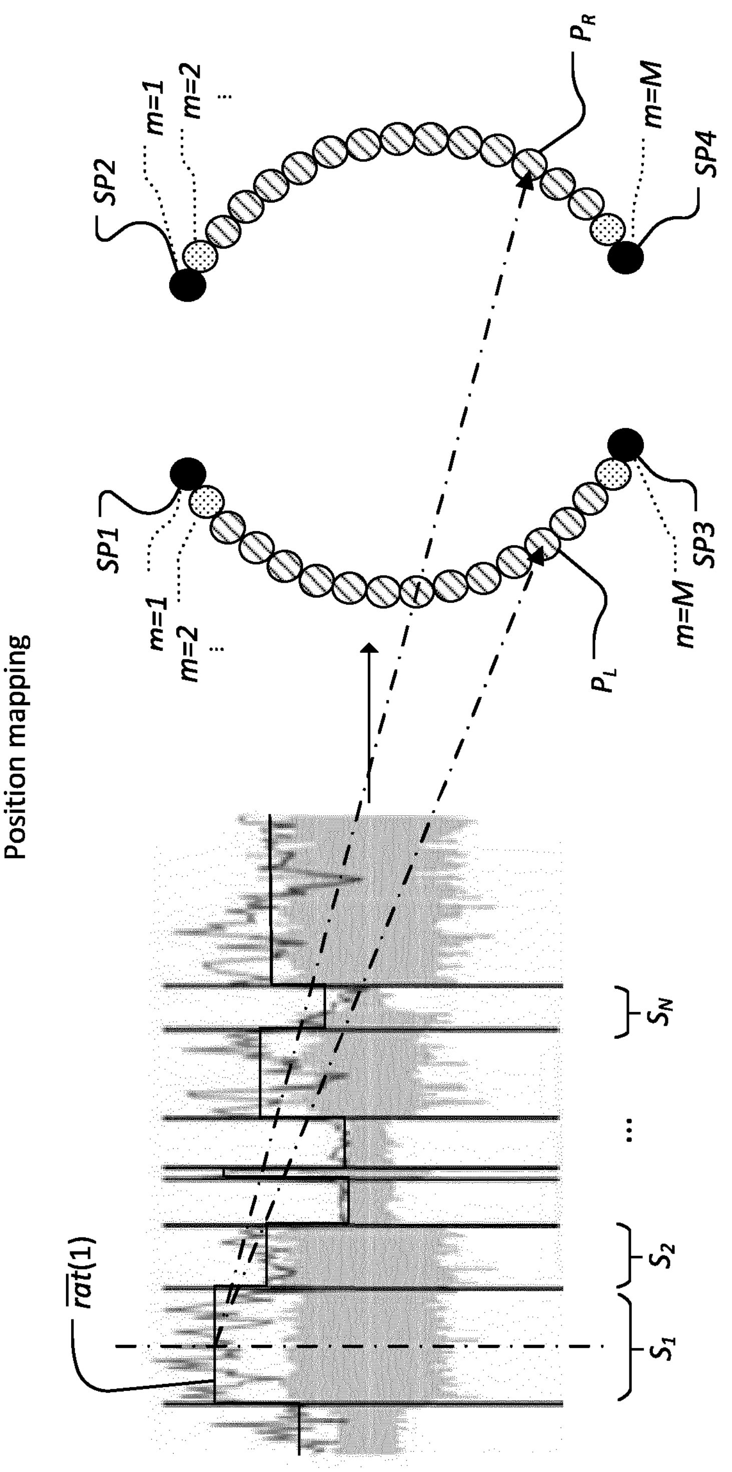
FIG. 8*a* shows an exemplary embodiment of a position mapping which determines positions of monopoles used for rendering a separated source.

FIG. 8*a* shows an exemplary embodiment of a position mapping which determines positions of monopoles used for rendering a separated source. This embodiment of FIG. 8*a* uses in particular a positioning index depending on the original balance between the separated channels of a music sound source separation process (e.g. a side-mid ratio, or smoothened side-mid ratio as described above in more detail), but it can be extended to other separation technology.

FIG. 8*a* shows in an exemplary way how the position mapping determines positions of monopoles based on the side-mid ratio determined from the separated source. On the left side of FIG. 8*a* it is shown the smoothened side-mid ratio $\overline{\mathrm{rat}}(n)$ for several segments $S_n$ of the separated source as identified by the segmentation process described in FIGS. 6*a* to 6*d* and by the smoothening process described in FIGS. 7*a* and 7*b*. On the right side of FIG. 8*a* it is shown the possible positions of two monopoles used for rendering the left and, respectively, right stereo channel of the separated source. The possible positions m=1 . . . , M of the two monopoles are represented by small circles. In the example of FIG. 8*a*, seventeen possible positions (M=17) for the left stereo channel are foreseen as positions m=1 . . . , M, which are arranged in a half circle on the left side of a listener. Seventeen additional possible positions for the right stereo channel are foreseen as positions m=1 . . . , M, which are arranged in a half circle on the right side of the listener. The black circles (at m=1 and M=M) define the positions of four (physical) speakers SP1, SP2, SP3, SP4 used to render the (virtual) monopoles. A first speaker SP1 is positioned front-left, a second speaker SP2 is positioned front-right, a third speaker SP3 is positioned rear-left, and a fourth speaker SP4 is positioned rear-left. The circles, having a dashed or dotted pattern indicate possible positions of virtual speakers rendered by speakers SP1, SP2, SP3, SP4. As indicated by the dash-dotted line the smoothened side mid ratio $\overline{\mathrm{rat}}(1)$ of segment $S_1$ is mapped by the mapping process to the specific monopole positions $P_L$ and $P_R$ for the left and, respectively, right stereo channel of the separated source.

It should be noted that it is difficult to render virtual monopoles directly at the position of a physical speaker, or very close to a physical speaker. Accordingly, the possible monopole positions which are close to one of the speakers SP1, SP2, SP3, SP4 are marked with a dotted pattern, whereas all other possible positions are marked with a dashed pattern.

In the embodiment of FIG. 8*a* described above, the number of the possible positions is seventeen per half circle, however the number of the possible positions may be any other number, such as twenty seven per half circle or the like.

Figure 8B:
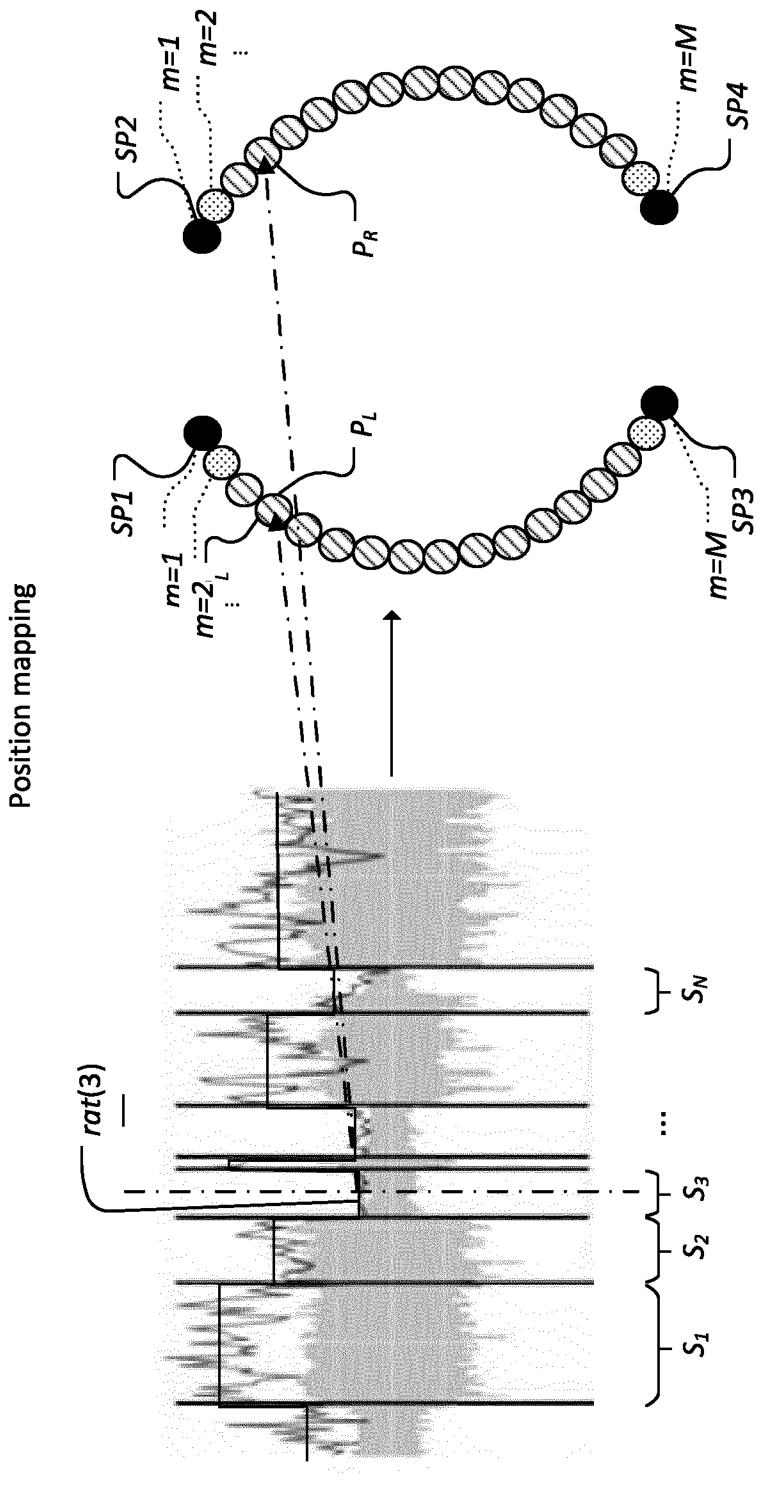
FIG. 8*b* shows a further exemplary embodiment of a position mapping which determines positions of monopoles used for rendering a separated source.

Still further, in the embodiment if FIG. 8*b*, four physical speakers are used to render the monopoles. However, in alternative embodiments, speaker systems with different numbers of speakers can be used for rendering the virtual monopoles, e.g. 5.1 speaker systems, soundbars, binaural headphones, speaker walls with many speakers, or the like.

FIG. 8*b* shows a further exemplary embodiment of a position mapping which determines positions of monopoles used for rendering a separated source. FIG. 8*b* is similar to FIG. 8*a*. However, the dash-dotted line indicates the mapping of the smoothened side mid ratio $\overline{\text{rat}}(3)$ of segment $S_3$ is to the specific monopole positions $P_L$ and $P_R$ for the left and right stereo channel of the separated source. According to the embodiments described here under reference of FIG. 8*a* and FIG. 8*b*, the lower the smoothened side-mid ratio $\overline{\text{rat}}(n)$ is, the closer to the positions of the two front (physical) speakers SP1 and SP2 are the chosen monopole positions for the left and right stereo channel of the separated source. The higher the side-mid ratio rat(n) is, and thus, the higher the smoothened side-mid ratio $\overline{\text{rat}}(n)$ is, the closer to the positions of the two rear (physical) speakers SP3 and SP4 are the chosen monopole positions for the left and right stereo channel of the separated source.

Figure 8C:
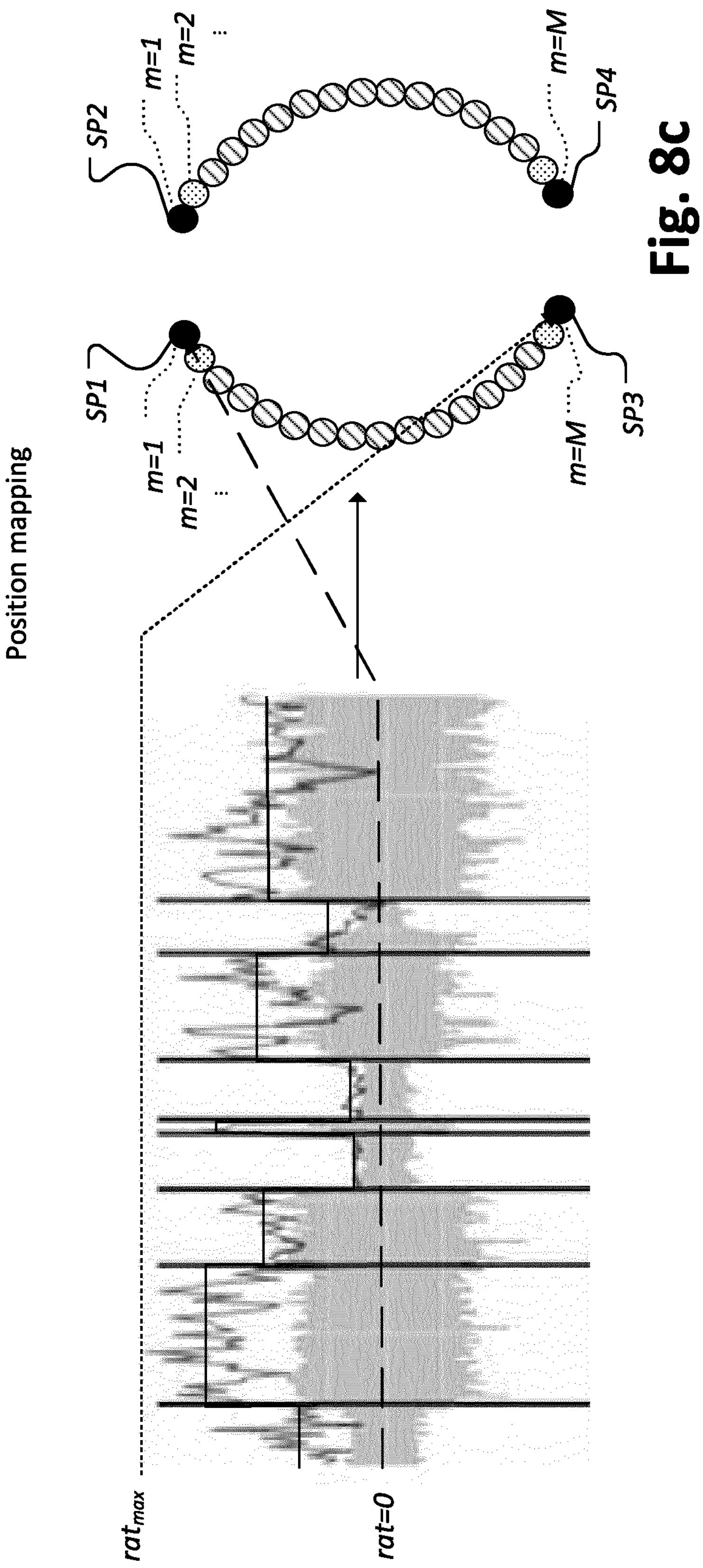
FIG. 8*c* shows a further exemplary embodiment of a position mapping which determines positions of monopoles used for rendering a separated source.

FIG. 8*c* shows a position mapping as performed for the maximum side-mid ratio and, respectively, the minimum side-mid ratio of the separated source. On the left side of FIG. 8*c*, $\text{rat}_{max}$ shows the maximum side-mid ratio determined from the separated source which is indicated by the dashed line and the side-mid ratio rat=0 which is indicated by the doubled dashed line. On the right side of FIG. 8*b*, it is shown the possible positions of two monopoles used for rendering the left and right stereo channel of the separated source, as described in FIG. 8*a* and FIG. 8*b* above. As indicated by the dashed line, the maximum side-mid ratio $\text{rat}_{max}$ is mapped, by the mapping process, to the monopole positions m=M which correspond to the positions of the two back speakers SP2 and SP3. As indicated by the double dashed line, the side mid ratio rat=0 is mapped to the monopole positions m=1 of the two front speakers SP1 and SP2.

The mapping between the smoothened side-mid ratio $\overline{\text{rat}}(n)$ and the position may for example be any arbitrary mapping of the ratio to a predefined discrete number of positions such as shown in FIGS. 8*a* and 8*b*.

For example, the mapping process may be performed as follows:

$$m(n) = \begin{cases} \text{floor}\left(\overline{\text{rat}}(n)\cdot\dfrac{M}{rat_{max}}\right)+1, & \text{rat} < rat_{max} \\ M, & \text{rat} = rat_{max} \end{cases}$$

Where, $\overline{\text{rat}}(n)$ is the smoothened side-mid ratio for segment $S_n$, $m(n)\in\{1, \ldots, M\}$ is the monopole position index to which $\overline{\text{rat}}(n)$ is mapped, M is the total number of monopole possible positions, and floor is the function that takes as input a real number x and gives as output the greatest integer less than or equal to x.

FIGS. 8*a*, *b*, and *c* show how the positions of a particular separated source are moving on portion of circles depending on the side-mid ratio. When the side-mid ratio is low (see FIG. 8*a*), the left and right channels are very similar (in the extreme case, see FIG. 8*c*, monaural). The perceived width of the stereo image will be narrow in this case. Therefore the sources are kept at their original position in the spatial mix like in a traditional 5.1 mix to the left and right front channels. When the side-mid ratio is high (see FIG. 8*a*), the left and right channels are very different (in the extreme case, each channel has a totally different content). The perceived width of the stereo image will be wide. Therefore the sources are shifted towards more extreme positions in the spatial mix, e.g. in a traditional 5.1 mix close to the left and right back channels. The direct link of the side-mid ratio feature with the perceived stereo width enables the system to keep the mixing aesthetics of the original stereo content during repositioning.

Figure 9:
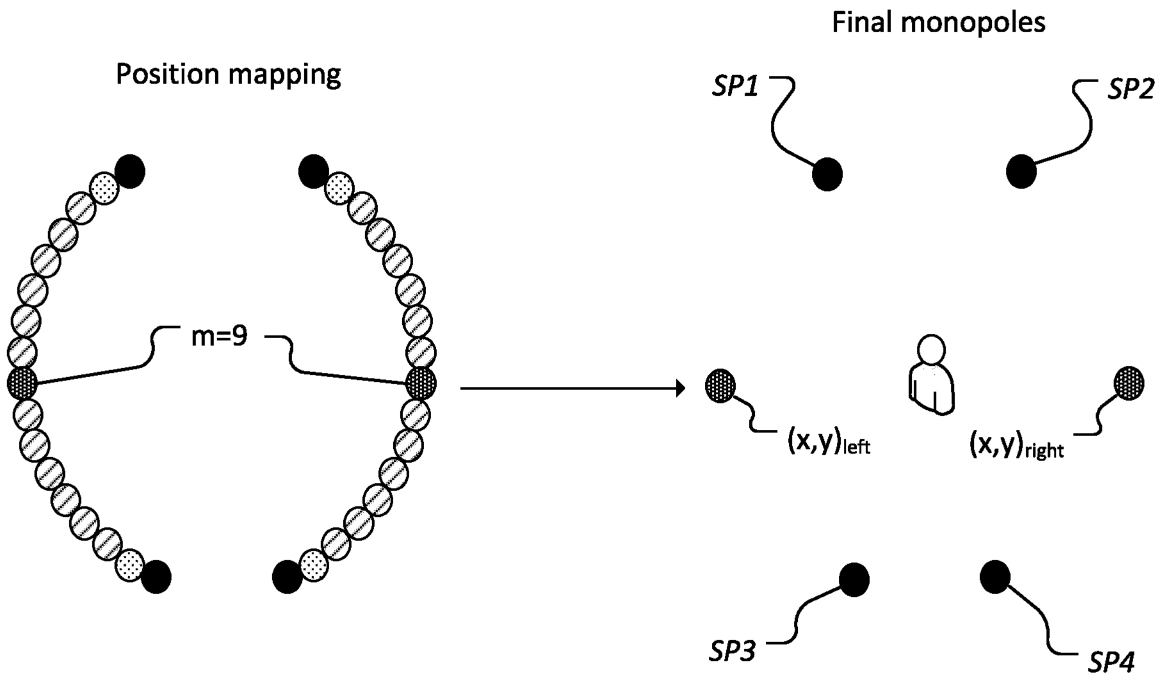
FIG. 9 visualizes how the position mapping is related with the specified positions of the two monopoles used for rendering the left and right stereo channel of the separated source.

FIG. 9 visualizes how the position mapping, which determines positions of monopoles based on the side-mid ratio determined from the separated source, is related with the specified positions of the two monopoles used for rendering the left and right stereo channel of the separated source. For each monopole position index m(n) a respective pair of position coordinates $(x, y)_L$ for the left stereo channel is prestored in a table, and a respective pair of position coordinates $(x, y)_R$ for the right stereo channel is prestored in a table. On the left side of FIG. 9, it is shown that the position mapping selected position index m=9 as position for the two monopoles used for rendering the left and, respectively, right stereo channel of the separated source, as described under the reference of FIGS. 8*a, b* and *c*. On the right side of FIG. 9, it is visualized how this specific monopole position index m=9 is translated to monopole position coordinates $(x, y)_L$ and monopole position coordinates $(x,y)_R$ for rendering the left and, respectively, right stereo channel of the separated source by a virtual sound rendering system (or 3D sound rendering system), e.g. a monopole synthesis technique as described in more detail with regard to FIG. 10 below, a binaural headphone technique, or the like.

In the above described mapping process the side-mid ratio $\overline{\text{rat}}(n)$ (or alternatively rat(i)) is mapped to a discrete number of possible positions. Alternatively, the position mapping may also be performed using a non-discrete way, e.g. an algorithmic process, in which the side-mid ratio $\overline{\text{rat}}(n)$ (or alternateviley rat(i)) is directly mapped to respective position coordinates $(x,y)_L$ and $(x,y)_R$.

Still further, in the embodiment described above, it is described that the position mapping happens for the left and the right stereo channel separately. In alternative embodiments, however, a position mapping as described above might only be performed for one of the stereo channels (e.g. the left channel), and the monopole position for the other stereo channel (e.g. the right channel) might be obtained by mirroring the position of the mapped stereo channel (e.g. left channel).

In the embodiments described above, the determination of the monopole positions for performing a rendering the stereo signal of a separated source is based on a side-mid ratio parameter obtained from the separated source. However, in alternative embodiments, other parameters of the separated source may be chosen to determine the monopole positions for rendering the stereo signal. For example, a dry/wet, or a primary/ambience indicator could also be used to modify the parameters of the audio-objects like spread in monopole synthesis, which would create a more enveloping sound field. Also combinations of such parameters might be used to modify the parameters of the audio-objects.

Monopole Synthesis

Figure 10:
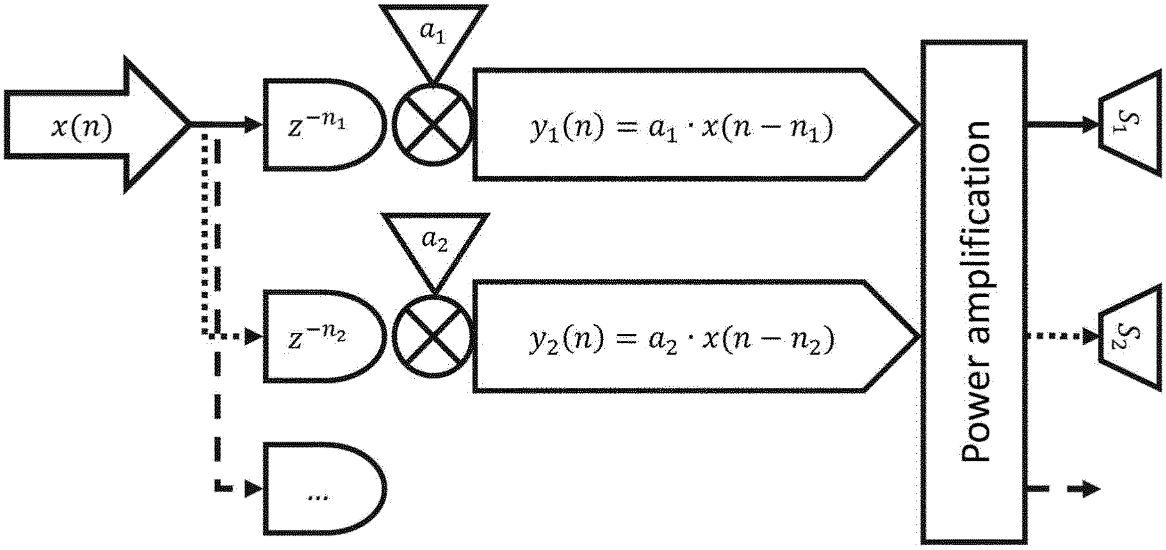
FIG. 10 provides an embodiment of a 3D audio rendering that is based on a digitalized Monopole Synthesis algorithm.

FIG. 10 provides an embodiment of a 3D audio rendering that is based on a digitalized Monopole Synthesis algorithm. The theoretical background of this technique is described in more detail in patent application US 2016/0037282 A1 which is herewith incorporated by reference.

The technique, which is implemented in the embodiments of US 2016/0037282 A1, is conceptually similar to the Wavefield synthesis, which uses a restricted number of acoustic enclosures to generate a defined sound field. The fundamental basis of the generation principle of the embodiments is, however, specific, since the synthesis does not try to model the sound field exactly but is based on a least square approach.

A target sound field is modelled as at least one target monopole placed at a defined target position. In one embodiment, the target sound field is modelled as one single target monopole. In other embodiments, the target sound field is modelled as multiple target monopoles placed at respective defined target positions. For example, each target monopole may represent a noise cancelation source comprised in a set of multiple noise cancelation sources positioned at a specific location within a space. The position of a target monopole may be moving. For example, a target monopole may adapt to the movement of a noise source to be attenuated. If multiple target monopoles are used to represent a target sound field, then the methods of synthesizing the sound of a target monopole based on a set of defined synthesis monopoles as described below may be applied for each target monopole independently, and the contributions of the synthesis monopoles obtained for each target monopole may be summed to reconstruct the target sound field.

A source signal x(n) is fed to delay units labelled by $z^{-n_p}$ and to amplification units $a_p$, where p=1, . . . , N is the index of the respective synthesis monopole used for synthesizing the target monopole signal. The delay and amplification units according to this embodiment may apply equation (117) of reference US 2016/0037282 A1 to compute the resulting signals $y_p(n)=s_p(n)$ which are used to synthesize the target monopole signal. The resulting signals $s_p(n)$ are power amplified and fed to loudspeaker $S_p$.

In this embodiment, the synthesis is thus performed in the form of delayed and amplified components of the source signal x.

According to this embodiment, the delay $n_p$ for a synthesis monopole indexed p is corresponding to the propagation time of sound for the Euclidean distance $r=R_{p0}=|r_p-r_o|$ between the target monopole $r_o$ and the generator $r_p$.

Further, according to this embodiment, the amplification factor $$a_p = \frac{\rho c}{R_{po}}$$

is inversely proportional to the distance $r=R_{p0}$.

In alternative embodiments of the system, the modified amplification factor according to equation (118) of reference US 2016/0037282 A1 can be used.

Example Process for Spatial Upmixing of Stereo Content

Figure 11:
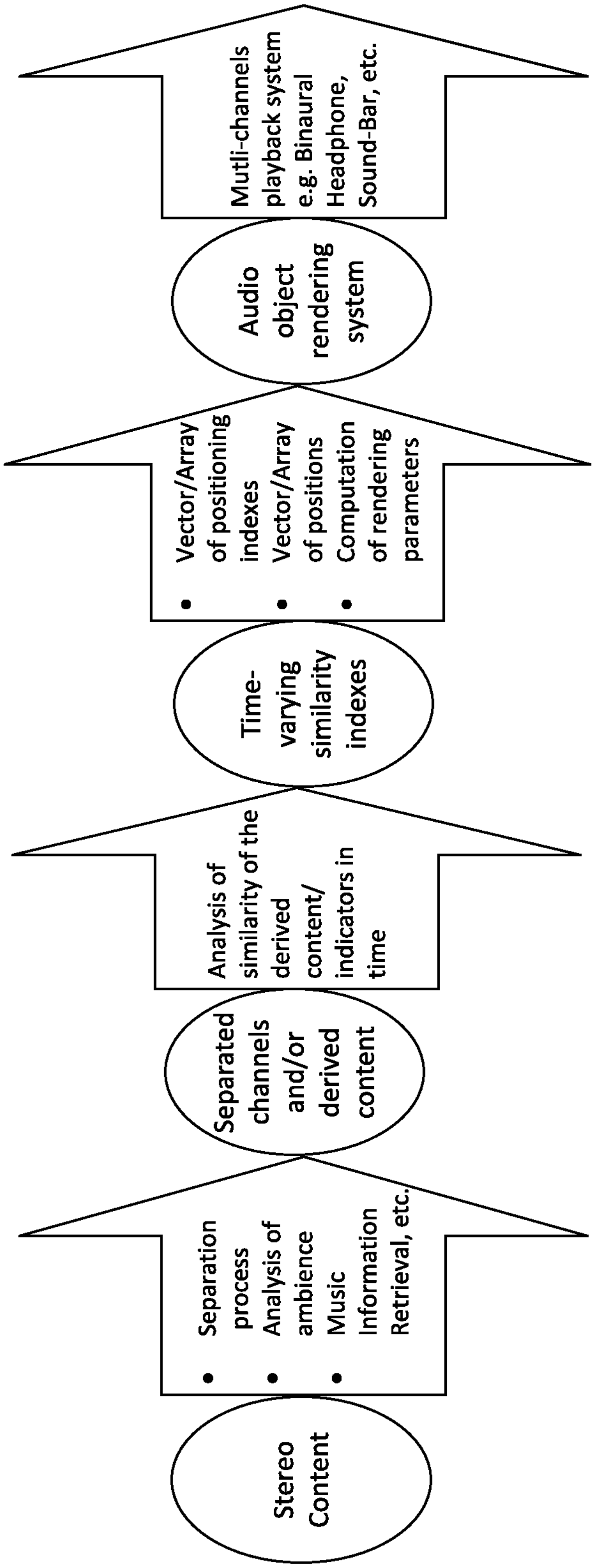
FIG. 11 schematically shows an embodiment of a process of automatic time-dependent spatial upmixing of four separated sources.

FIG. 11 schematically shows an embodiment of a process of a time-dependent spatial upmixing of separated sources. A stereo content (see 1 in FIG. 2) is processed using a source separation process (e.g. BSS), an analysis of ambience, a Music Information Retrieval, or the like, to obtain separated channels and/or derived content. Analysis of similarity of the derived content is performed to obtain indicators (e.g. a side-mid ratio rat, or the like) in time in order to determine segments with similar characteristics (e.g. as described with regard to FIGS. 6*a* to *d* above). Time-varying similarity indexes (e.g. m=1; . . . ;M in FIGS. 8*a, b, c*) are obtained based on the similarity of the derived source separation content in time and then the time-varying indexes are used to derive spatial indexes for position mapping. Time-varying parameters may be signal level/loudness between separated channels, spectral balance, primary/ambience, dry/wet, percussive/harmonic content or the like. The spatial indexes are vector/array of positioning indexes, which point to vector/array of positions and computation of rendering parameters. An audio object rendering system, which may be multi-channels playback system e.g. Binaural Headphone, Sound-Bar, or the like, renders the audio signal to the speakers.

Figure 12:
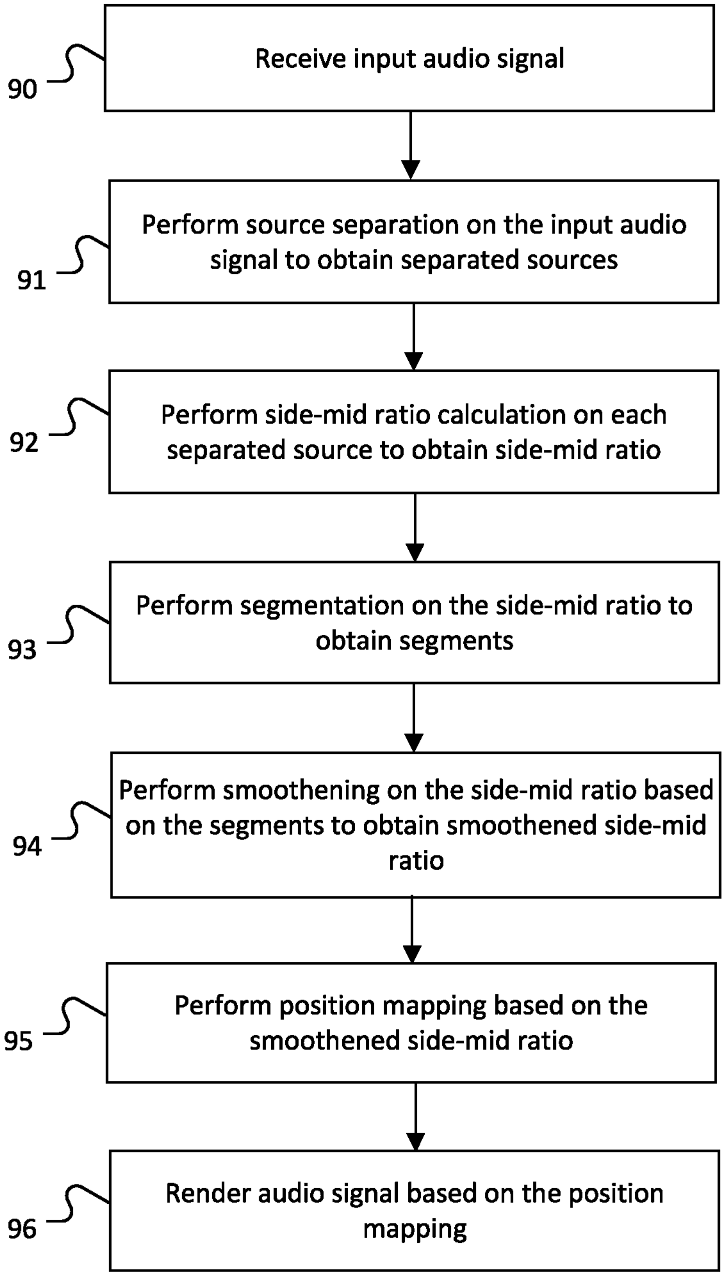
FIG. 12 shows a flow diagram visualizing a method for performing time-dependent spatial upmixing of separated sources.

FIG. 12 shows a flow diagram visualizing an exemplifying method for performing time-dependent spatial upmixing of separated sources, namely bass 2*a*, drums 2*b*, other 2*c* and vocals 2*d*. At 90, the source separation 2 (see FIG. 2 and FIG. 3) receives an input audio signal (see stereo file 1 in FIG. 2). At 91, source separation 2 is performed on the input audio signal to obtain separated sources 2*a*-2*d* (see FIG. 2). At 92, side-mid ratio calculation is performed on each separated source to obtain side-mid ratio (see FIGS. 5*a*-5*b*). At 93, segmentation 9 is perform on the side-mid ratio to obtain segments (see FIGS. 6*a*-6*b*). At 94, smoothening 9 is performed on the side-mid ratio based on the segments to obtain smoothened side-mid ratio (see FIGS. 7*a*-7*b*). At 95, position mapping is performed based on the smoothened side-mid ratio (see FIGS. 8*a*-8*c*). During position mapping, spatial positioning parameters are derived, which depend on time-varying parameters obtained during source separation. A monopole pair, from a plurality of final monopoles 7, is determined, for each of the separated sources 2*a*-2*d* (see FIG. 2), based on the position mapping 6 (see FIG. 3, FIGS. 8*a*-8*c* and FIG. 9). At 96, Render audio signal based on the position mapping 6.

Real-Time Processing

The above described process of upmixing/remixing by dynamically determining parameters of audio objects to be rendered by e.g. a 3D audio rendering process may be performed as a post-processing step on an audio source file, respectively on the separated sources that have been obtained from the audio source file by a source separation process. In such a post processing scenario, the whole audio file is available for processing. Accordingly, a side-mid ratio may be determined for all beats/windows/frames of a separated source as described in FIGS. 5*a* to 5*c*, and a segmentation process as described in FIGS. 6*a*, to 6*d* may be applied to the whole audio file.

The above processes may, however, also be implemented as a real-time system. For example, upmixing/remixing of a stereo file may be performed in real-time on a received audio stream. In the case that the audio signal is processed in real time, it is not appropriate to determine segments of the audio stream only after receipt of the complete audio file (piece of music, or the like). However, a change of audio characteristics or segment boundaries should be detected "on-the-fly" during the streaming process, so that the audio object rendering parameters can be changed immediately after detection of a change, during streaming of the audio file.

For example, a smoothening may be performed by continuously determining a parameter such as the side-mid ratio, and by continuously determining the standard deviation σ of this parameter. Current changes in the parameter can be related to the standard deviation σ. If a current change in the parameter is large with respect to the standard deviation, then the system may determine that there is a significant change in the audio characteristics. A significant change in the audio signal (a jump) may for example be detected when a difference between subsequent parameters (e.g. per-beat side-mid ratio) in the signal is higher than a threshold value, for example, when the difference is equal to 2σ, or the like, without limiting the present disclosure in that regard.

Such a significant change in the audio characteristics which is detected on-the-fly can be treated like a segment boundary described in the embodiments above. That is, the significant change in the audio characteristics may trigger a reconfiguration of the parameters of the 3D audio rendering process, e.g. a repositioning of monopole positions used in monopole synthesis.

Implementation

Figure 13:
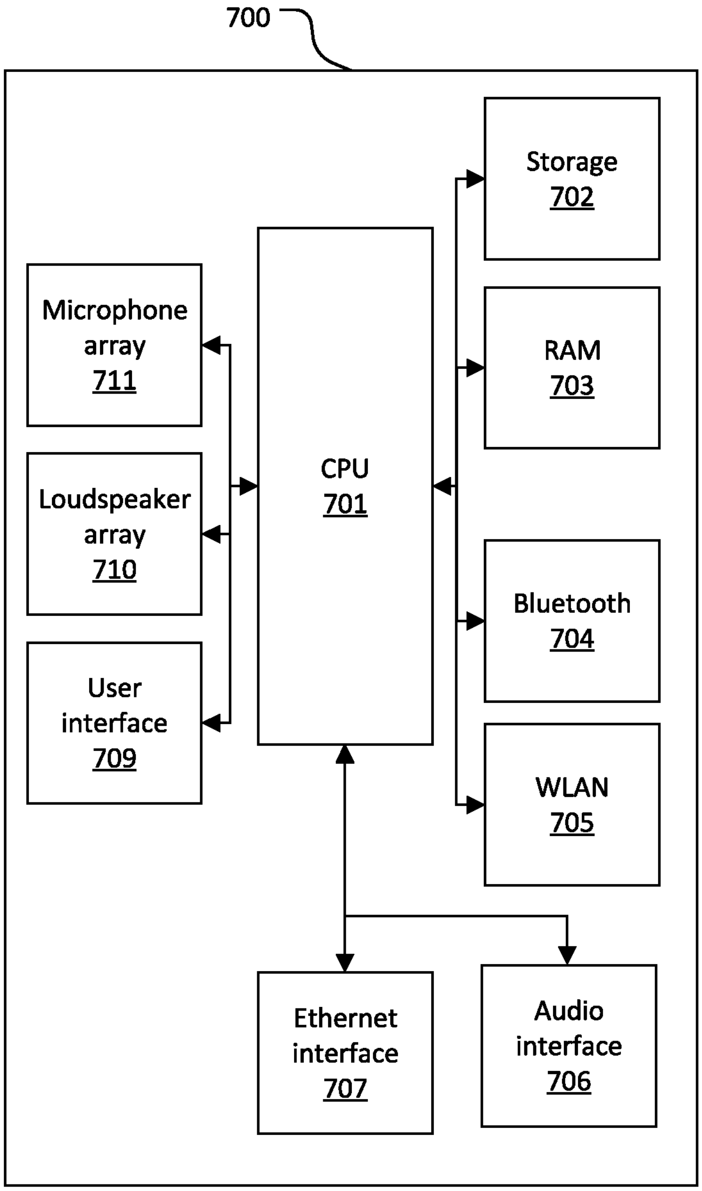
FIG. 13 schematically describes an embodiment of an electronic device that can implement the processes of automatic time-dependent spatial upmixing of separated sources.

FIG. 13 schematically describes an embodiment of an electronic device that can implement the processes of automatic time-dependent spatial upmixing of separated sources, i.e. separations, as described above. The electronic device 700 comprises a CPU 701 as processor. The electronic device 700 further comprises a microphone array 711 and a loudspeaker array 710 that are connected to the processor 701. Processor 701 may for example implement a source separation 2, side-mid ratio calculation 5 and a position mapping 6 that realize the processes described with regard to FIG. 2, FIG. 3, FIGS. 8*a*-8*c* and FIG. 9 in more detail. Loudspeaker array 710 consists of one or more loudspeakers that are distributed over a predefined space and is configured to render 3D audio. The electronic device 700 further comprises an audio interface 706 that is connected to the processor 701. The audio interface 706 acts as an input interface via which the user is able to input an audio signal, for example an audio interface can be a USB audio interface, or the like. Moreover, the electronic device 700 further comprises a user interface 709 that is connected to the processor 701. This user interface 709 acts as a man-machine interface and enables a dialogue between an administrator and the electronic system. For example, an administrator may make configurations to the system using this user interface 709. The electronic device 701 further comprises an Ethernet interface 707, a Bluetooth interface 704, and a WLAN interface 705. These units 704, 705 act as I/O interfaces for data communication with external devices. For example, additional loudspeakers, microphones, and video cameras with Ethernet, WLAN or Bluetooth connection may be coupled to the processor 701 via these interfaces 707, 704, and 705.

The electronic system 700 further comprises a data storage 702 and a data memory 703 (here a RAM). The data memory 703 is arranged to temporarily store or cache data or computer instructions for processing by the processor 701. The data storage 702 is arranged as a long-term storage, e.g. for recording sensor data obtained from the microphone array 710. The data storage 702 may also store audio data that represents audio messages, which the public announcement system may transport to people moving in the predefined space.

It should be noted that the description above is only an example configuration. Alternative configurations may be implemented with additional or other sensors, storage devices, interfaces, or the like.

It should be recognized that the embodiments describe methods with an exemplary ordering of method steps. The specific ordering of method steps is, however, given for illustrative purposes only and should not be construed as binding.

It should also be noted that the division of the electronic system of FIG. 13 into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device comprising circuitry configured to analyze the results of a stereo or multi-channel source separation to determine one or more time-varying parameters, and to create spatially dynamic audio objects based on the one or more time-varying parameters.

(2) The electronic device of (1), wherein the circuitry is configured to determine, as a time-varying parameter, a parameter describing the signal level-loudness between separated channels, and/or a spectral balance parameter, and/or a primary-ambience indicator, and/or a dry-wet indicator, and/or a parameter describing the percussive-harmonic content.

(3) The electronic device of (1) or (2), wherein the circuitry is configured to determine, as a time-varying parameter, a parameter describing the balance of instruments in a stereo content, and to create the spatially dynamic audio objects based on the balance of instruments in the stereo content.

(4) The electronic device of (1) to (3), wherein the circuitry is configured to determine, as a time-varying parameter, a side-mid ratio of a separated source, and to create the spatially dynamic audio objects based on the side-mid ratio.

(5) The electronic device of (1) to (4), wherein the circuitry is configured to determine spatial positioning parameters for the audio objects based on the one or more time-varying parameters obtained from the results of the stereo or multi-channel source separation.

(6) The electronic device of (1) to (5), wherein the circuitry is configured to dynamically adapt positioning parameters of the audio objects.

(7) The electronic device of (1) to (6), wherein the circuitry is configured to create the spatially dynamic audio objects by monopole synthesis.

(8) The electronic device of (1) to (7), wherein the circuitry is configured to dynamically adapt a spread in monopole synthesis.

(9) The electronic device of (1) to (8), wherein the spatially dynamic audio objects are monopoles.

(10) The electronic device of (1) to (9), wherein the circuitry is configured to dynamically create, based on the one or more time-varying parameter, a first monopole used for rendering the left channel of a separated source, and a second monopole used for rendering the right channel of the separated source.

(11) The electronic device of (1) to (10), wherein the circuitry is configured to create, from the results of the multi-channel source separation, a time-dependent spatial upmix which preserves the original balance of the content.

(12) The electronic device of (1) to (11), wherein the circuitry is further configured to perform, based on the time-varying parameter, a segmentation process to obtain segments of a separated source.

(13) The electronic device of (1) to (12), wherein the circuitry is configured to perform a cluster detection based on the time-varying parameter.

(14) The electronic device of (1) to (13), wherein the circuitry is configured to perform automatic time-dependent spatial upmixing based on the results of a similarity analysis of multi-channels content.

(15) The electronic device of (1) to (14), wherein the circuitry is configured to perform a smoothening process on the segments of the separated source.

(16) The electronic device of (1) to (15), wherein the circuitry is configured to perform a beat detection process to analyze the results of the multi-channel source separation.

(17) The electronic device of (1) to (16), wherein the time-varying parameter is determined per beat, per window, or per frame of a separated source or original content.

(18) A method comprising analyzing the results of a stereo or multi-channel source separation to determine one or more time-varying parameters, and to create spatially dynamic audio objects based on the one or more time-varying parameters.

(19) A computer program comprising instructions which, when the program is executed by a computer, cause the computer to carry out the method of (18).

The invention claimed is:

1. An electronic device comprising:

circuitry configured to:

perform a stereo or multi-channel source separation resulting in a plurality of separated sources, analyze the plurality of separated sources to determine one or more time-varying parameters, and create spatially dynamic audio objects based on the one or more time-varying parameters.

2. The electronic device of claim 1, wherein the circuitry is configured to determine, as the one or more time-varying parameters, at least one of a parameter describing a relative signal level-loudness between separated channels, a spectral balance parameter, a primary-ambience indicator, a dry-wet indicator, or a parameter describing a percussive-harmonic content.

3. The electronic device of claim 1, wherein the circuitry is configured to:

determine, as the one or more time-varying parameters, a parameter describing a balance of instruments in a stereo content, and create the spatially dynamic audio objects based on the balance of instruments in the stereo content.

4. The electronic device of claim 1, wherein the circuitry is configured to:

determine, as the one or more time-varying parameters, a side-mid ratio of at least one of the plurality of separated sources, the side-mid ratio relating a side signal and a mid signal, and create the spatially dynamic audio objects based on the side-mid ratio.

5. The electronic device of claim 1, wherein the circuitry is configured to determine spatial positioning parameters for the spatially dynamic audio objects based on the one or more time-varying parameters.

6. The electronic device of claim 5, wherein the circuitry is configured to dynamically adapt the positioning parameters of the spatially dynamic audio objects.

7. The electronic device of claim 1, wherein the circuitry is configured to create the spatially dynamic audio objects by monopole synthesis.

8. The electronic device of claim 7, wherein the circuitry is configured to dynamically adapt a spread in the monopole synthesis.

9. The electronic device of claim 1, wherein the spatially dynamic audio objects are monopoles.

10. The electronic device of claim 9, wherein the circuitry is configured to dynamically create, based on the one or more time-varying parameter, a first monopole used for rendering a left channel of one of the plurality of separated sources and a second monopole used for rendering a right channel of the one of the plurality of separated sources.

11. The electronic device of claim 1, wherein the circuitry is configured to create, from the plurality of separated sources, a time-dependent spatial upmix which preserves an original balance of content.

12. The electronic device of claim 1, wherein the circuitry is further configured to perform, based on the one or more time-varying parameters, a segmentation process to obtain segments of the plurality of separated sources.

13. The electronic device of claim 12, wherein the circuitry is configured to perform a cluster detection based on the one or more time-varying parameters in the segmentation process.

14. The electronic device of claim 12, wherein the circuitry is configured to perform automatic time-dependent spatial upmixing based on the results of a similarity analysis of each of the plurality of separated sources.

15. The electronic device of claim 12, wherein the circuitry is configured to perform a smoothening process on the segments of the plurality of separated sources.

16. The electronic device of claim 1, wherein the circuitry is configured to perform a beat detection process to analyze the plurality of separated sources to determine the one or more time-varying parameters.

17. The electronic device of claim 16, wherein the one or more time-varying parameters are determined per beat, per window, or per frame of one of the separated sources or original content.

18. A method comprising:

performing a stereo or multi-channel source separation resulting in a plurality of separated sources, analyzing the plurality of separated sources to determine one or more time-varying parameters, and creating spatially dynamic audio objects based on the one or more time-varying parameters.

19. A non-transitory computer readable medium storing a computer program comprising instructions which, when the computer program is executed by a computer, cause the computer to carry out the method of claim 18.

20. The electronic device of claim 10, wherein the circuitry is further configured to position, based on the one or more time-varying parameter, the first monopole and the second monopole closer to a front when the one or more time-varying parameter is lower and closer to a back when the one or more time-varying parameter is higher.

* * * * *